US007956900B2

(12) United States Patent
Itoh

(10) Patent No.: US 7,956,900 B2

(45) Date of Patent: Jun. 7, 2011

(54) VIDEO DELIVERY DEVICE, VIDEO DELIVERY METHOD, VIDEO DELIVERY PROGRAM AND RECORDING MEDIUM

(75) Inventor: Naoto Itoh, Saitama (JP)

(73) Assignee: Pioneer Corporation, Tokyo (JP)

( * ) Notice: Subject to any disclaimer, the term of this patent is extended or adjusted under 35 U.S.C. 154(b) by 781 days.

(21) Appl. No.: 11/916,229

(22) PCT Filed: May 19, 2006

(86) PCT No.: PCT/JP2006/309991

§ 371 (c)(1),
(2), (4) Date: Nov. 30, 2007

(87) PCT Pub. No.: WO2006/129496

PCT Pub. Date: Dec. 7, 2006

(65) Prior Publication Data

US 2010/0189408 A1 Jul. 29, 2010

(30) Foreign Application Priority Data

Jun. 1, 2005 (JP) ................................ 2005-161252

(51) Int. Cl.
*H04N 5/232* (2006.01)

(52) U.S. Cl. ................................. 348/211.9; 348/222.1

(58) Field of Classification Search .. 348/211.1–211.14, 348/211.99, 222.1
See application file for complete search history.

(56) References Cited

U.S. PATENT DOCUMENTS

| | | | | |
|---|---|---|---|---|
| 7,281,054 | B2 | 10/2007 | Ishioka et al. | |
| 7,525,881 | B2 * | 4/2009 | Suzuki | 369/30.09 |
| 7,782,363 | B2 * | 8/2010 | Ortiz | 348/211.8 |
| 2003/0112337 | A1 * | 6/2003 | Sato et al. | 348/211.13 |
| 2006/0061664 | A1 * | 3/2006 | Ito | 348/211.11 |
| 2006/0181541 | A1 | 8/2006 | Emura et al. | |

FOREIGN PATENT DOCUMENTS

| | | | |
|---|---|---|---|
| JP | 2002-149554 | A | 5/2002 |
| JP | 2002-185837 | A | 6/2002 |
| JP | 2003-032660 | A | 1/2003 |
| JP | 2004-128570 | A | 4/2004 |
| JP | 2004-328377 | A | 11/2004 |
| JP | 2005-044181 | A | 2/2005 |
| JP | 2005-107829 | A | 4/2005 |

* cited by examiner

*Primary Examiner* — Gevell Selby
(74) *Attorney, Agent, or Firm* — Foley & Lardner LLP

(57) ABSTRACT

A video distributing apparatus that distributes video data of a program to an external viewer includes an editing-data calculating unit that calculates, based on scenario data describing contents of the program and reservation data describing a reservation for a video shoot using a camera, editing data indicating the contents of the video data; a video-data acquiring unit that selectively acquires, based on the editing data, the video data shot by the camera installed at a fixed position; and an output unit that outputs, to the external viewer, the video data acquired by the video-data acquiring unit. As a result, video data corresponding to the demands of each user can be easily acquired without requiring equipment and personnel to switch the camera angles and edit the shot video.

9 Claims, 27 Drawing Sheets

```
<PROGRAM METADATA>
    <DB ROOT="distribution server 001"/>
    <PROGRAM METADATA ID="contents_meta_data_001"、DB="program metadata DB"/>
    <SCENARIO METADATA ID="scenario_meta_data_001"、DB="scenario metadata DB"/>
    <PROGRAM DATE/TIME="February 8, 2005 (Tue)"/>
    <GENRE ID="music"、CATEGORY="modern jazz"、DB="genre category DB"/>
    <VENUE INFORMATION>
        <VENUE NAME="jazz pioneer"/>
        <URL="http://www.jazz.pioneer.co.jp"/>
    </VENUE INFORMATION>
    <PERFORMER>
        <BAND NAME="jazz quartet"/>
        <NUMBER OF MEMBER ="4"/>
        <MEMBER1="Suzuki Yoichi"、INSTRUMENT="saxophone"、LEADER="true"/>
        <MEMBER2="Sato Ai"、INSTRUMENT="piano"/>
        <MEMBER3="Tanaka Ryuhei"、INSTRUMENT="base"/>
        <MEMBER4="Yamamoto Ponta"、INSTRUMENT="drums"/>
    </PERFORMER>
    <CHARGE ALL="1000 yen" CHARGE PER SONG="300 yen"/>
    <BRIEF INTRODUCTION="A night of modern jazz by progressive and young spirited members."/>
    <NUMBER OF STAGES="2"/>
    <STAGE1>
        <SCHEDULED START="19:30"、SCHEDULED FINISH="20:30"/>
        <NUMBER OF PROGRAMS="3"/>
        <PROGRAM1="I Remember In April"/>
        <PROGRAM2="May Wind"/>
        <PERFORMANCE3="June Rain"/>
    </STAGE1>
    <STAGE2>
        <SCHEDULED START="21:30"、SCHEDULED FINISH="22:30"/>
        <NUMBER OF PROGRAMS="2"/>
        <PROGRAM4="Dream of July"/>
        <PERFORMANCE5="Summer Seaside Story"/>
    </STAGE2>
</PROGRAM METADATA>
```

FIG.8

GENRE/CATEGORY DB

GENRE : MUSIC

| No. | CATEGORY | AVE. SONG LENGTH | INSTRU-MENTAL SOLO | AVERAGE SOLO LENGTH | NUMBER OF SOLOS | MOVEMENT | TALKING | SCENARIO |
|---|---|---|---|---|---|---|---|---|
| 1 | MODERN JAZZ | 12MIN. | YES | 2MIN. | 3 | INTERME-DIATE | LOW | DOES NOT FOLLOW |
| 2 | ROCK | 8MIN. | YES | 1MIN. | 1 | HIGH | INTERME-DIATE | FOLLOWS |
| 3 | POP | 5MIN. | YES | 15SEC. | 1 | HIGH | INTERME-DIATE | FOLLOWS |
| 4 | POPULAR CONTEMPO-RARY MUSIC | 3MIN. | NO | — | — | LOW | HIGH | FOLLOWS |
| | 801 | 802 | 803 | 804 | 805 | 806 | 807 | 808 |

```
    <SCENARIO METADATA>
901     <DB ROUTE="distribution server 001"/>
902     <PROGRAM METADATA ID="contents_meta_data_001"、DB="program metadata DB"/>
903     <SCENARIO METADATA ID="scenario_meta_data_001"、DB="scenario metadata DB"/>
904     <CAMERA SETTING="camera setting1"、DB="camera settingDB"/>
        <GENRE/CATEGORY="music/modern jazz"、DB="genre/category DB"/>
        <PROGRAM DATE/TIME="February 8, 2005 (Tue)"/>
        <HALL INFORMATION>
            <HALL TYPE="club"、HALL NAME="jazz pioneer"/>
            <URL="http://www.jazz.pioneer.co.jp"/>
        </HALL INFORMATION>
        <PERFORMER>
            <BAND NAME="jazz quartet"/>
            <NUMBER OF MEMBER="4"/>
905         <MEMBER1>
                <NAME="Suzuki Yoichi"/>
                <LEADER="true"/>
                <INSTRUMENT="instrument1"、DB="instrument DB"/>
                <PROFILE="http://www.musiciannet.co.jp/youichi_suzuki.html"/>
                <FACE="face1.jpg"、DB="face DB"/>
                <VOICE="voice1.wma、DB="voice DB"/>
                <INSTRUMENT SOUND="instrument sound1.wma、 DB="instrument sound DB"/>
            </MEMBER1>
            <MEMBER2>
                :
            </MEMBER2>
            <MEMBER3>
                :
            </MEMBER3>
            <MEMBER4>
                <NAME="Yamamoto Ponta"/>
                <INSTRUMENT="instrument4"、 DB="instrumentDB"/>
                <PROFILE="http://www.musiciannet.co.jp/ponta_yamamoto.html"/>
                <FACE="face4.jpg"、DB=faceDB"/>
                <VOICE="voice4.wma、DB="voiceDB"/>
                <INSTRUMENT SOUND="instrument sound4.wma、 DB="instrument soundDB"/>
            </MEMBER4>
        </PERFORMER>
        <NUMBER OF STAGES="2"/>
        <STAGE1>
            <SCHEDULED START="19:30"、 SCHEDULED FINISH="20:30"/>
            <NUMBER OF PROGRAMS="3"/>
            <PROGRAM1>
                :
            <PROGRAM1/>
            <PROGRAM2>
                <SONG TITLE="The Winds of May"/>
                <STYLE="style2"/>
                <COPYRIGHT="copyright1002"、DB="copyright DB"/>
            <PROGRAM2/>
            <PROGRAM3>
                :
            <PROGRAM3/>
        </STAGE1>
        <STAGE2>
            <SCHEDULED START="21:30" SCHEDULED FINISH="22:30"/>
            <NUMBER OF PROGRAMS="2"/>
            <PROGRAM1>
                <SONG TITLE="Dreams of July"/>
                <STYLE="style4"/>
                <COPYRIGHT="copyright1004"、DB="copyright DB"/>
            <PROGRAM1/>
            <PROGRAM2>
                :
            <PROGRAM2/>
        </STAGE2>
        <LEARNING="learning1"、DB="learning DB"/>
    </SCENARIO METADATA>
```

CAMERA SETTING DB

| No. | CAMERA SETTING ID (1001) | CAMERA ID (1002) | ZOOM (1003) | PAN (1004) | TILT (1005) | SUBJECT (1006) |
|---|---|---|---|---|---|---|
| 1 | CAMERA SETTING 1 | CAMERA A-0 | -30 | 0 | -35 | ALL |
| | | CAMERA A-1 | 0 | 0 | -45 | INSTRUMENT 1 |
| | | CAMERA A-2 | +30 | 0 | -25 | INSTRUMENT 4 |
| | | CAMERA B-0 | 0 | +30 | -45 | INSTRUMENT 2 |
| | | CAMERA C-0 | 0 | -45 | -45 | INSTRUMENT 1 |
| | | CAMERA D-0 | 0 | -60 | -60 | INSTRUMENT 3 |
| 2 | CAMERA SETTING 2 | | | | | |
| 3 | CAMERA SETTING 3 | | | | | |
| 4 | CAMERA SETTING 4 | | | | | |

INST DB

| No. | INSTRUMENT ID | INSTRUMENT NAME | MEMBER ID |
|---|---|---|---|
| 1 | INSTRUMENT 1 | SAXOPHONE | MEMBER 1 |
| 2 | INSTRUMENT 2 | PIANO | MEMBER 2 |
| 3 | INSTRUMENT 3 | BASE | MEMBER 3 |
| 4 | INSTRUMENT 4 | DRUMS | MEMBER 4 |

STYLE DB 1501 1502

| No. | STYLE ID | STYLE | | | | | | |
|---|---|---|---|---|---|---|---|---|
| | | INTRODUCTION | THEME | AD-LIB1 | AD-LIB2 | AD-LIB3 | AFTER THEME | ENDING |
| 1 | STYLE 1 | INSTRUMENT 2 | INSTRUMENT 1 | INSTRUMENT 1 | INSTRUMENT 2 | INSTRUMENT 4 | INSTRUMENT 1 | INSTRUMENT 2 |
| 2 | STYLE 2 | — | INSTRUMENT 1 | INSTRUMENT 2 | — | — | INSTRUMENT 1 | — |
| 3 | STYLE 3 | INSTRUMENT 4 | INSTRUMENT 2 | INSTRUMENT 3 | INSTRUMENT 1 | INSTRUMENT 2 | INSTRUMENT 2 | — |
| 4 | STYLE 4 | — | INSTRUMENT 1 | INSTRUMENT 1 | INSTRUMENT 2 | — | INSTRUMENT 1 | INSTRUMENT 2 |

LEARNING DB

| No. | LEARNING ID (1601) | AVE. SONG LENGTH (1602) | INSTRU-MENTAL SOLO (1603) | AVERAGE SOLOLENGTH (1604) | NUMBER OF SOLOS (1605) | MOVEMENT (1606) | TALKING (1607) | SCENARIO (1608) |
|---|---|---|---|---|---|---|---|---|
| 1 | LEARNING 1 | 15MIN. | YES | 3MIN. | 3 | INTERMEDI-ATE | INTERMEDI-ATE | DOES NOT FOLLOW |
| 2 | | | | | | | | |
| 3 | | | | | | | | |
| 4 | | | | | | | | |

COPYRIGHT DB

| No. | COPYRIGHT ID (1701) | SONG TITLE (1702) | SONG WRITER (1703) | LYRICIST (1704) | ARRANGER (1705) | PRODUCTION YEAR (1706) |
|---|---|---|---|---|---|---|
| 1 | ... | | | | | |
| ... | | | | | | |
| 1001 | COPYRIGHT 1001 | I REMEMBER IN APRIL | M. DAVIS | ... | W. SHORTER | APR, 1960 |
| 1002 | COPYRIGHT 1002 | MAY WIND | J. COLTANE | ... | M. TYNER | MAY, 1963 |
| 1003 | COPYRIGHT 1003 | JUNE RAIN | | | | |
| 1004 | COPYRIGHT 1004 | DREAM OF JULY | | | | |
| 1005 | COPYRIGHT 1005 | SUMMER SEASIDE STORY | | | | |
| 1006 | COPYRIGHT 1006 | | | | | |
| ... | ... | | | | | |

```
<EDITING METADATA>
  <DB ROUTE="distribution server 001"/>   901
  <PROGRAM METADATA ID="contents_meta_data_001", DB="program metadata DB"/>   902
  <SCENARIO METADATA ID="scenario_meta_data_001", DB="scenario metadata DB"/>   903
  <EDITIING METADATA ID="authoring_meta_data_001", DB="editing metadata DB/>   1801
  <NUMBER OF STAGES="2"/>                                                       1802a
  <EDITING1>
      <MEMBER ANGLE="standard"/>
      <INSTRUMENT ANGLE="standard"/>
      <STAGE1>
          <START="19:32" END="20:44"/>
          <NUMBER OF PROGRAMS="3"/>
1802 →    <PROGRAM1>
           <TIME="19:32,, 19:34", CAMERA ID="cameraA-0", ANGLE="overall"/>
           <TIME="19:34,, 19:36", CAMERA ID="cameraC-0", ANGLE="member1,, instrument1", MAIN="true"/>
           <TIME="19:36,, 19:38", CAMERA ID="cameraB-0", ANGLE="member2,, instrument2", MAIN="true"/>
           <TIME="19:38,, 19:40", CAMERA ID="cameraD-0", ANGLE="member3,, instrument3", MAIN="true"/>
           <TIME="19:40,, 19:42", CAMERA ID="cameraA-2", ANGLE="member4,, instrument4", MAIN="true"/>
           <TIME="19:42,, 19:44", CAMERA ID="cameraA-0", ANGLE="overall"/>
          </PROGRAM1>
          <PROGRAM2>
              ....
          </PROGRAM2>
          <PROGRAM3>
              ....
          </PROGRAM3>
      </STAGE1>
      </STAGE2>
          ....
          ....
      </STAGE2>
  </EDITING1>
  <EDITING2>
      <MEMBER ANGLE="member2"/>
      <INSTRUMENT ANGLE="instrument2"/>
      <STAGE1>
          <START="9:32"END="20:43"/>
          <NUMBER OF PROGRAMS="3"/>
          <PROGRAM1>
           <TIME="19:32,, 19:34", CAMERA ID="cameraA-0",, ANGLE="overall"/>
           <TIME="19:34,, 19:36", CAMERA ID="cameraB-0", ANGLE="member2", MAIN="false">
           <TIME="19:36,, 19:38", CAMERA ID="cameraB-0", ANGLE="member2", MAIN="true"/>
           <TIME="19:38,, 19:42", CAMERA ID="cameraB-0", ANGLE="member2", MAIN="false"/>
           <TIME="19:42,, 19:44", CAMERA ID="cameraA-0", ANGLE="overall"/>
          </PROGRAM1>
          <PROGRAM2>
              ....
          </PROGRAM2>
          <PROGRAM3>
              ....
          </PROGRAM3>
      </STAGE1>
      <STAGE2>
          ....
      </STAGE2>
  </EDITING2>
  <EDITING3>
      ....
  </EDITING3>                                                                   1802b
<EDITING METADATA>
```

```
<DISTRIBUTION METADATA>
    <DB ROUTE="distribution server 001"/>   901
    <PROGRAM METADATA ID="contents_meta_data_001"、DB="program metadata DB"/>   902
    <SCENARIO METADATA ID="scenario_meta_data_001"、DB="scenario metadata DB"/>   903
    <EDITING METADATA ID="authoring_meta_data_001"、DB="editing metadata DB/>   1801
    <DISTRIBUTION METADATA ID="streming_meta_data_001"、DB="distribution metadata DB/>   2001
    <DISTRIBUTION SUBSCRIBER>
        <SUBSCRIBER ID="0028967485"/>
        <PASSWORD="mk15ju4k"/>
        <EVALUATION=""/>   2002
        <COMMENTS=""/>
        <SUBSCRIBER PREFERENCES="comedy, human drama"/>
    </DISTRIBUTION SUBSCRIBER>
    <CONTENT QUALITY="rankA"/>
    <DISTRIBUTION METHOD="streaming"/>
    <EDITING REQUEST="false"/>   2003
    <NUMBER OF STAGES="2"/>
    <EDITING1>
        <MEMBER ANGLE="standard"/>
        <INSTRUMENT ANGLE="standard"/>
        <STAGE1>
            <START="19:32" END="20:44"/>
            <NUMBER OF PROGRAMS="3"/>
            <PROGRAM1>
2004          <TIME="19:32,、19:34"、CAMERA ID="cameraA-0"、ANGLE="overall"/>
              <TIME="19:34,、19:36"、CAMERA ID="cameraC-0"、ANGLE="member1,、instrument1"、MAIN="true"/>
              <TIME="19:36,、19:38"、CAMERA ID="cameraB-0"、ANGLE="member2,、instrument2"、MAIN="true"/>
              <TIME="19:38,、19:40"、CAMERA ID="cameraD-0"、ANGLE="member3,、instrument3"、MAIN="true"/>
              <TIME="19:40,、19:42"、CAMERA ID="cameraA-2"、ANGLE="member4,、instrument4"、MAIN="true"/>
              <TIME="19:42,、19:44"、CAMERA ID="cameraA-0"、ANGLE="overall"/>
            </PROGRAM1>
            <PROGRAM2>
                ....
            </PROGRAM2>
            <PROGRAM3>
                ....
            </PROGRAM3>
        </STAGE1>
        <STAGE2>
            ....
            ....
        </STAGE2>
    </EDITING1>
    <ENTRANCE AND EXITING>
        <ENTRANCE AND EXITING1=""/>   2005
        <ENTRANCE AND EXITING2=""/>
    </ENTRANCE AND EXITING>
    <CHARGES>
        <TODAY=""/>   2006
        <TOTAL CHARGES="4,800 yen"/>
    </CHARGES>
</DISTRIBUTION METADATA>
```

```
<DISTRIBUTION METADATA>
  <DB ROUTE="distribution server 001"/>   901
  <PROGRAM METADATA ID="contents_meta_data_001"、DB="program metadata DB"/>   902
  <SCENARIO METADATA ID="scenario_meta_data_001"、DB="scenario metadata DB"/>   903
  <EDITING METADATA ID="authoring_meta_data_001"、DB="editing metadata DB/>   1801
  <DISTRIBUTION METADATA ID="streming_meta_data_001"、DB="distribution metadata DB/>   2001
  <DISTRIBUTION SUBSCRIBER>
     <SUBSCRIBER ID="0028967485"/>
     <PASSWORD="mk15ju4k"/>   2002
     <EVALUATION="Good"/>
     <COMMENTS="Thank you for the wonderful PROGRAM."/>
     <SUBSCRIBER PREFERENCES="modem jazz, comedy, human drama"/>
  </DISTRIBUTION SUBSCRIBER>
  <CONTENT QUALITY="rankA"/>
  <DISTRIBUTION METHOD="streaming"/>   2003
  <EDITING REQUEST="false"/>
  <NUMBER OF STAGES="2"/>
  <EDITING1>
      <MEMBER ANGLE="standard"/>
      <INSTRUMENT ANGLE="standard"/>
      <STAGE1>
          <START="19:32" END="20:44"/>
          <NUMBER OF PROGRAMS="3"/>
          <PROGRAM1>
              <TIME="19:32,、19:34"、CAMERA ID="cameraA-0"、ANGLE="overall"/>
2004          <TIME="19:34,、19:36"、CAMERA ID="cameraC-0"、ANGLE="member1,、instrument1"、MAIN="true"/>
              <TIME="19:36,、19:38"、CAMERA ID="cameraB-0"、ANGLE="member2,、instrument2"、MAIN="true"/>
              <TIME="19:38,、19:40"、CAMERA ID="cameraD-0"、ANGLE="member3,、instrument3"、MAIN="true"/>
              <TIME="19:40,、19:42"、CAMERA ID="cameraA-2"、ANGLE="member4,、instrument4"、MAIN="true"/>
              <TIME="19:42,、19:44"、CAMERA ID="cameraA-0"、ANGLE="overall"/>
          </PROGRAM1>
          <PROGRAM2>
              ....
          </PROGRAM2>
          <PROGRAM3>
              ....
          </PROGRAM3>
      </STAGE1>
      <STAGE2>
          ....
          ....
      </STAGE2>
  </EDITING1>
  <ENTRANCE AND EXITING>
      <ENTRANCE AND EXITING1="19:20, 20:35"/>   2005
      <ENTRANCE AND EXITING2="21:20, 22:35"/>
  </ENTRANCE AND EXITING>
  <CHARGES>
      <TODAY="1,000 yen"/>   2006
      <TOTAL CHARGES="5,800 yen"/>
  </CHARGES>
</DISTRIBUTION METADATA>
```

```
<DISTRIBUTION METADATA>
    <DB ROUTE="distribution server 001"/>  901
    <PROGRAM METADATA ID="contents_meta_data_001"、DB="program metadata DB"/>  902
    <SCENARIO METADATA ID="scenario_meta_data_001"、DB="scenario metadata DB"/>  903
    <EDITIING METADATA ID="authoring_meta_data_001"、DB="editiing metadata DB/>  1801
    <DISTRIBUTION METADATA ID="streming_meta_data_002"、DB="distribution metadata DB/>  2001
    <DISTRIBUTION SUBSCRIBER>
        <SUBSCRIBER ID="050031072"/>
        <PASSWORD="oxb7d98j"/>
        <EVALUATION="Average"/>  2002
        <COMMENTS="The camera angle is strange."/>
        <SUBSCRIBER PREFERENCES="modern jazz, opera, Japanese rakugo"/>
    </DISTRIBUTION SUBSCRIBER>
    <CONTENT QUALITY="rankB"/>
    <DISTRIBUTION METHOD="server"/>
    <EDITING REQUEST="true"/>  2003
    <NUMBER OF STAGES="2"/>
    <EDITING2>
        <MEMBER ANGLE="member2"/>
        <INSTRUMENT ANGLE="instrument2"/>
        <STAGE1>
            <START="19:32" END="20:43"/>
            <NUMBER OF PROGRAMS="3"/>
            <PROGRAM1>
                <TIME="19:32,、19:34"、CAMERA ID="cameraA-0"、、ANGLE="overall"/>
2004            <TIME="19:34,、19:36"、CAMERA ID="cameraB-0"、ANGLE="member2"、 MAIN="false"/>
                <TIME="19:36,、19:38"、CAMERA ID="cameraB-0"、ANGLE="member2"、 MAIN="true"/>
                <TIME="19:38,、19:42"、CAMERA ID="cameraB-0"、ANGLE="member2"、 MAIN="false"/>
                <TIME="19:42,、19:44"、CAMERA ID="cameraA-0"、ANGLE="overall"/>
            </PROGRAM1>
            <PROGRAM2>
                ....
            </PROGRAM2>
            <PROGRAM3>
                ....
            </PROGRAM3>
        </STAGE1>
        <STAGE2>
            ....
        </STAGE2>
    </EDITING2>
    <ENTRANCE AND EXITING>
        <ENTRANCE AND EXITING1="19:30, 19:45"/>  2005
        <ENTRANCE AND EXITING2="20:10, 20:15"/>
        <ENTRANCE AND EXITING3="22:10, 22:30"/>
    </ENTRANCE AND EXITING>
    <CHARGES>
        <TODAY="600 yen"/>  2006
        <TOTAL CHARGES="12,900 yen"/>
    </CHARGES>
</DISTRIBUTION METADATA>
```

```
<MANAGEMENT METADATA>
   <DB ROUTE="distribution server 001"/>   ← 901
   <PROGRAM METADATA ID="contents_meta_data_001"、 DB="program metadata DB"/>   ← 902
   <SCENARIO METADATA ID="scenario_meta_data_001"、 DB="scenario metadata DB"/>   ← 903
   <EDITIING METADATA ID="authoring_meta_data_001"、 DB="editing metadata DB/>   ← 1801
   <DISTRIBUTION SUBSCRIBER>
        <NUMBER OF DISTRIBUTIONS="30"/>
        <DISTRIBUTION SUBSCRIBER1>
           <DISTRIBUTION SUBSCRIBERID="002896748"/>
           <EDITING METADATA="EDITING1"/>   ← 2601
           <VIEWED PROGRAM="all"/>
        </DISTRIBUTION SUBSCRIBER1>
        <DISTRIBUTION SUBSCRIBER2>
           <DISTRIBUTION SUBSCRIBER ID="050031072"/>
           <EDITING METADATA="EDITING2"/>
           <VIEWED PROGRAM="program1、 program3、 program5"/>
        </DISTRIBUTION SUBSCRIBER2>
        <DISTRIBUTION SUBSCRIBER3=""/>
        <DISTRIBUTION SUBSCRIBER4=""/>
   </DISTRIBUTION SUBSCRIBER>
   <EVALUATION>
             <EVALUATION GOOD="15"、 EVALUATION AVERAGE="10"、 EVALUATION POOR="3"、 EVALUATION NONE="2"/>   ← 2602
   </EVALUATION>
   <COMMENTS>   ← 2603
        <COMMENT1="Thank you for the wonderful program."/>
        <COMMENT2="The camera angle is strange."/>
        ......
   </COMMENTS>
   <CHARGES>
        <TOTAL="42,000 yen"/>   ← 2604
   </CHARGES>
   <ROYALTY>
        <TOTAL="5,000 yen"/>   ← 2605
        <PAYMENT="payable"/>
   </ROYALTY>
   <VIEWING RATE>
        <TOTAL="1.2%"/>   ← 2606
   </VIEWING RATE>
</MANAGEMENT METADATA>
```

FIG.27

| ORDER OF PROCESSES OR WORK | LOCATION OF PROCESS OR WORK | DETAILS OF PROCESS OR WORK |
|---|---|---|
| 1 | CAMERA SYSTEM | GENERATE PROGRAM METADATA |
| 2 | DISTRIBUTION SYSTEM | GENERATE SCENARIO METADATA (ALSO POSSIBLE AT CAMERA SYSTEM) GENERATE PROGRAM TABLE |
| 3 | NETWORK VIEWER TERMINAL | GENERATE ELECTRONIC RESERVATION DATA AND OUTPUT |
| 4 | DISTRIBUTION SYSTEM | OUTPUT SCENARIO METADATA TO CAMERA SYSTEM |
| 5 | CAMERA SYSTEM | SET CAMERAS BASED ON SCENARIO METADATA |
| 6 | CAMERA SYSTEM | OUTPUT FILMING DATA AND VIDEO DATA TO DISTRIBUTION SYSTEM |
| 7 | DISTRIBUTION SYSTEM | CALCULATE EDITING METADATA |
| 8 | DISTRIBUTION SYSTEM | CALCULATE DISTRIBUTION METADATA, OUTPUT VIDEO DATA TO NETWORK VIEWER TERMINAL |
| 9 | NETWORK VIEWER TERMINAL | PLAY VIDEO DATA, OUTPUT EVALUATION DATA TO DISTRIBUTION SYSTEM |
| 10 | DISTRIBUTION SYSTEM | UPDATE EDITING METADATA, CALCULATE MANAGEMENT METADATA |

```
<SCENARIO METADATA>
    <DB ROUTE="distribution server 002"/>  901
    <PROGRAM METADATA ID="contents_meta_data_001"、 DB="program metadata DB"/>  902
    <SCENARIO METADATA ID="scenario_meta_data_001"、 DB="scenario metadata DB"/>  903
    <CAMERA SETTING="camera setting1"、 DB="camera setting DB"/>  904
    <GENRE/CATEGORY="music/classical"/>
    <PROGRAM DATE/TIME="March 24, 2005 (Thu)"/>
    <HALL INFORMATION>
        <HALL TYPE="music hall"、 HALL NAME="Pioneer Music Hall"/>
        <URL="http://www.classic.pioneer.co.jp"/>
    </HALL INFORMATION>
    <PERFORMER>
        <NAME OF PARTICIPATING GROUP="Pioneer Orchestra"/>
        <NUMBER OF MEMBERS="6"/>
        <MEMBER1>                                                        905
            <NAME="strings"/>
            <INSTRUMENT="instrument1"、 DB="inst DB"/>
            <INSTRUMENT SOUND="instrument sound1.wma、 DB="instrument sound DB"/>
        </MEMBER1>
        <MEMBER2>
            <NAME="woods/>
            <INSTRUMENT="instrument2"、 DB="inst DB"/>
            <INSTRUMENT SOUND="instrument sound2.wma、 DB="instrument sound DB"/>
        </MEMBER2>
        <MEMBER3>
            <NAME="brass"/>
            <INSTRUMENT="instrument3"、 DB="inst DB"/>
            <INSTRUMENT SOUND="instrument sound3.wma、 DB="instrument sound DB"/>
        </MEMBER3>
        <MEMBER4>
            <NAME="percussions"/>
            <INSTRUMENT="instrument4"、 DB="inst DB"/>
            <INSTRUMENT SOUND="instrument sound4.wma、 DB="instrument sound DB"/>
        </MEMBER4>
    </PERFORMER>
    <NUMBER OF STAGES="1"/>
    <STAGE1>
        <SCHEDULED START="19:30" SCHEDULED FINISH="20:10"/>
        <NUMBER OF PROGRAMS="1"/>
        <PROGRAM1>
            <SONG TITLE="Lyrical Symphony"/>
            <STYLE="style1"/>
            <COPYRIGHT="copyright1001"、 DB="copyrightDB"/>
            <NUMBER OF CUTS.="6"、 BAR NUMBER="1, 600"/>
              <CUTno.="1"、 BAR NUMBER="1, 100"、 CAMERA ID="cameraA"、 ANGLE="overall"/>
              <CUTno.="2"、 BAR NUMBER="101, 200"、 CAMERA ID="cameraB"、 ANGLE="MEMBER1"/>
              <CUTno.="3"、 BAR NUMBER="201, 300"、 CAMERA ID="cameraC"、 ANGLE="MEMBER2"/>
              <CUTno.="4"、 BAR NUMBER="301, 400"、 CAMERA ID="cameraD"、 ANGLE="MEMBER3"/>
              <CUTno.="5"、 BAR NUMBER="401, 500"、 CAMERA ID="cameraE"、 ANGLE="MEMBER4"/>
              <CUTno.="8"、 BAR NUMBER="501, 600"、 CAMERA ID="cameraA"、 ANGLE="overall"/>
            </NUMBER OF CUTS>
        <PROGRAM1/>
    </STAGE1>
    <LEARNING="learning1"、 DB="learningDB"/>
</SCENARIO METADATA>
```

```
<EDITING METADATA>
    <DB ROUTE="distribution server 002"/>   ← 901
    <PROGRAM METADATA ID="contents_meta_data_001"、DB="program metadata DB"/>   902
    <SCENARIO METADATA ID="scenario_meta_data_001"、DB="scenario metadataDB"/>
    <EDITIING METADATA ID="authoring_meta_data_001"、DB="editing metadataDB/>   903
    <NUMBER OF STAGES="1"/>   1801
    <EDITING1>
        <MEMBER ANGLE="standard"/>
        <INSTRUMENT ANGLE="standard"/>
        <STAGE1>
            <START="19:30" END="20:00"/>
            <NUMBER OF PERFORMANCES="1"/>
            <PROGRAM1>
1802 →          <TIME="19:30, 19:35"、CAMERA ID="cameraA"、ANGLE="overall"/>
                <TIME="19:35, 19:40"、CAMERA ID="cameraB"、ANGLE="member1"/>
                <TIME="19:40, 19:45"、CAMERA ID="cameraC"、ANGLE="member2"/>
                <TIME="19:45, 19:50"、CAMERA ID="cameraD"、ANGLE="member3"/>
                <TIME="19:50, 19:55"、CAMERA ID="cameraE"、ANGLE="member4"/>
                <TIME="19:55, 20:00"、CAMERA ID="cameraA"、ANGLE="overall"/>
            </PROGRAM1>
        </STAGE1>
    </EDITING1>
</EDITING METADATA>
```

```
<EDITING METADATA>
    <DB ROUTE="distribution server 004"/>   ← 901
    <PROGRAM METADATA ID="contents_meta_data_001"、DB="program metadata DB"/>   902
    <SCENARIO METADATA ID="scenario_meta_data_001"、DB="scenario metadata DB"/>
    <EDITIING METADATA ID="authoring_meta_data_001"、DB="editiing metadata DB/>   903
    <NUMBER OF STAGES="1"/>   1801
    <EDITING1>
        <MEMBER ANGLE="excitement"/>
        <STAGE1>
            <START="19:30" END="19:50"/>
            <NUMBER OF PERFORMANCES="1"/>   ← 1802
            <PROGRAM1>
                <TIME="19:30, 19:32"、CAMERA ID="cameraA"、ANGLE="overall"/>
                <TIME="19:40, 19:42"、CAMERA ID="cameraB"、ANGLE="member1"/>
                <TIME="19:38, 19:40"、CAMERA ID="cameraC"、ANGLE="member2"/>
            </PROGRAM1>
        </STAGE1>
    </EDITING1>
</EDITING METADATA>
```

<SCENARIO METADATA>
<DB ROUTE="distribution server001"/> 901
<PROGRAM METADATA ID/> 902
<SCENARIO METADATA ID/> 903
<CAMERA SETTING/> 904
<GENRE/>
<PERFORMANCE DATE/TIME="February 8, 2005 (Tue)"/>
<HALL INFORMATION/>
<PERFORMER/> 905
<NUMBER OF STAGES="2"/>
<STAGE1/>
<STAGE2/>
<LEARNING="learning1"、DB="learning DB"/>
<INFORMATION PROTECTION="true"/>
</SCENARIO METADATA>

VIDEO DELIVERY DEVICE, VIDEO DELIVERY METHOD, VIDEO DELIVERY PROGRAM AND RECORDING MEDIUM

TECHNICAL FIELD

The present invention relates to a video distributing apparatus, a video distributing method, a video distributing program, and a recording medium. However, application of the invention is not limited to the video distributing apparatus, the video distributing method, the video distributing program, and the recording medium.

BACKGROUND ART

Conventionally, for example, a technique exists in which automated filming is efficiently executed by multiple robot cameras that mutually exchange filming information by communication through a scenario server to film an object whose position is detected three-dimensionally and by controlling the camera work of the robot cameras (see, for example, Patent Document 1).

Further, for example, a technique exists involving the use of three apparatuses: an information recording and transmitting apparatus that records a video of live performance; an information editing and distributing apparatus that processes the recorded information by editing and distributes the edited information; and an information processing apparatus that receives the distributed information, in which the video of the live performance is automatically recorded by remotely operating the information recording and transmitting apparatus using the information editing and distributing apparatus (see, for example, Patent Document 2). According to the technique described in Patent Document 2, the recorded image data is distributed through a communication network such as the Internet to a user who requests the image data.

Patent Document 1: Japanese Patent Application Laid-Open Publication No. 2002-185837

Patent Document 2: Japanese Patent Application Laid-Open Publication No. 2004-328377

DISCLOSURE OF INVENTION

Problem to be Solved by the Invention

However, the technique described in Patent Document 1 assumes implementation using a relatively large-scale system such as a scenario server and robot cameras. A problem, for example, exists in that to bring such a large-scale system into a place where performances are presented regularly, such as a small-scale club offering live performances or a playhouse, is practicably difficult.

According to the technique described in Patent Document 2, a problem exists, for example, in that although the recorded video data can be distributed to the user, evaluation by the user of the distributed video data, etc. can not be returned to the distribution origin of the video data and user demand can not be reflected.

Furthermore, the techniques respectively described in the above Patent Documents 1 and 2 require a high cost to be realized. The cost of equipment tends to be reflected in utilization fees. Therefore, the cost born by the user increases.

Means for Solving Problem

A video distributing apparatus according to the invention of claim 1, includes an editing-data calculating unit that, based on scenario data having described therein information concerning the contents of a program, calculates editing data concerning the contents of video data of the contents of the program; a video data acquiring unit that selectively acquires video data shot by a camera installed at a fixed position based on the editing data calculated by the editing-data calculating unit; and an output unit that outputs the video data acquired by the video data acquiring unit to an external viewer, in which the editing-data calculating unit further calculates the editing data based on reservation data having described therein information concerning reservation of the shooting by the camera.

A video distributing method according to the invention of claim 9, includes an editing-data calculating step of calculating, based on scenario data having described therein information concerning the contents of a program, editing data concerning the contents of video data of the contents of the program; a video data acquiring step of acquiring selectively video data shot by a camera installed at a fixed position based on the editing data calculated by the editing-data calculating unit; and an outputting step of outputting the video data acquired by the video data acquiring unit to an external viewer, in which at the editing-data calculating step calculating the editing data is further based on reservation data having described therein information concerning reservation of the shooting by the camera.

A video distributing computer program according to the invention of claim 10, causes a computer to execute the video distributing method according to claim 9.

A computer-readable recording medium according to the invention of claim 11, stores therein the video distributing program according to claim 10.

BRIEF DESCRIPTION OF DRAWINGS

FIG. 7 is a diagram for explaining an example of program metadata;

FIG. 8 is a diagram for explaining a genre/category DB;

FIG. 9 is a diagram for explaining an example of scenario metadata;

FIG. 10 is a diagram for explaining a camera setting DB;

FIG. 11 is a diagram for explaining an inst DB;

FIG. 15 is a diagram for explaining a style DB;

FIG. 16 is a diagram for explaining a learning DB;

FIG. 17 is a diagram for explaining a copyright DB;

FIG. 18 is a diagram for explaining an example of editing-metadata;

FIG. 20 is a diagram for explaining an example of distribution metadata;

FIG. 21 is a diagram explaining an example of the distribution metadata;

FIG. 24 is a diagram for explaining an example of the distribution metadata;

FIG. 26 is a diagram for explaining an example of management metadata;

FIG. 27 is a diagram for explaining a schematic sequence of processes or work in the camera/distribution system in the example;

FIG. 30 is a diagram for explaining an example of the scenario metadata;

FIG. 31 is a diagram for explaining an example of the editing-metadata;

FIG. 32 is a diagram for explaining an example of the editing-metadata; and

FIG. 33 is a diagram for explaining an example of the scenario metadata.

EXPLANATIONS OF LETTERS OR NUMERALS

Figure 1:
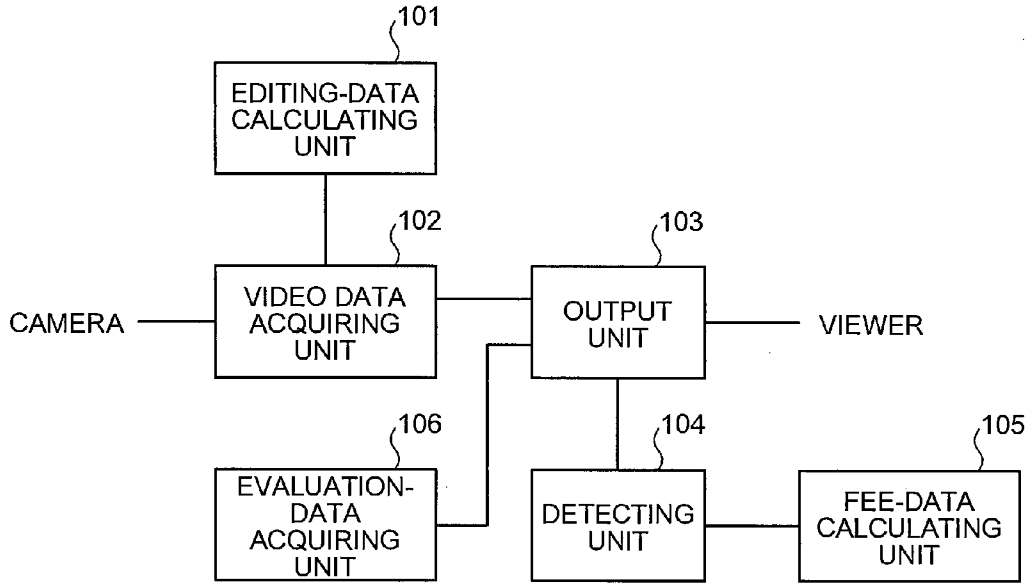
FIG. 1 is a block diagram of a functional configuration of a video distributing apparatus.

101 editing-data calculating unit
102 video data acquiring unit
103 output unit
104 detecting unit
105 fee-data calculating unit
106 evaluation-data acquiring unit

BEST MODE(S) FOR CARRYING OUT THE INVENTION

Referring to the accompanying drawings, exemplary embodiments according to the present invention are explained in detail below for a video distributing apparatus, a video distributing method, a video distributing program, and a recording medium according to the present invention.

(Functional Configuration of Video Distributing Apparatus)

FIG. 1 is a block diagram of a functional configuration of a video distributing apparatus. The video distributing apparatus includes an editing-data calculating unit 101, a video data acquiring unit 102, an output unit 103, a detecting unit 104, a fee-data calculating unit 105, and an evaluation data acquiring unit 106. The video distributing apparatus is provided, for example, being communicable with a control apparatus that controls a camera installed at a fixed position. Further, the video distributing apparatus is provided being communicable with an external viewer to view and listen to the video filmed by the camera.

Based on scenario data having described therein information concerning the contents of a program, the editing-data calculating unit 101 calculates editing data concerning the contents of the video data of the program. The scenario data is produced in advance prior to the actual performance of the program, for example, by a person at the facility where the program is held and the cameras, etc. are installed. The editing-data calculating unit 101 may calculate editing data based on reservation data having described therein information concerning a reservation for a video shoot using the cameras. The editing-data calculating unit 101 may further calculate the editing data based on rule data that describes the rules of progress of the contents of the program. The editing data may be, for example, metadata.

Metadata herein is data to describe data and has described therein information concerning data. Metadata is described according to a description format such as, for example, an XML (eXtensible Markup Language) format. Although the description for XML is omitted because XML is a known technique, XML is a markup language characterized in that, in XML, the document structure can be described in a simple format such as HTML and each tag can be specifically defined. A markup language is a language that employs a scheme in which various types of attribute information (such as character types (e.g., italics and boldface), composition information, hyper link information), etc., other than character codes of character strings are described in a document as commands that have been defined in advance. By using XML, for example, page description that is more functional than the HTML document can be realized on the Internet.

The video data acquiring unit 102 selectively acquires, based on the editing data calculated by the editing-data calculating unit 101, the video data shot by the camera installed at a fixed position. The video data acquiring unit 102 may acquire the video data shot by a controlled camera based on control data. The camera may be one, or plural of cameras installed respectively at fixed positions. When plural cameras are used, the video data acquiring unit 102 selectively acquires target video data from the video data shot by each camera.

The output unit 103 outputs the video data acquired by the video data acquiring unit 102 to an external viewer. The output unit 103 may output the control data to the camera to control the camerawork of the camera or to the control apparatus to control the camera based on the editing data calculated by the editing-data calculating unit 101. The output unit 103 may output the control data based on evaluation data acquired by the evaluation data acquiring unit 106.

The detecting unit 104 detects the output result of the video data by the output unit 103. The fee-data calculating unit 105 calculates fee data concerning the usage charge corresponding to the output video data based on the detection result detected by the detecting unit 104. The evaluation data acquiring unit 106 acquires the evaluation data for the video data output by the output unit 103.

(Procedure of Video Distributing Apparatus)

Figure 2:
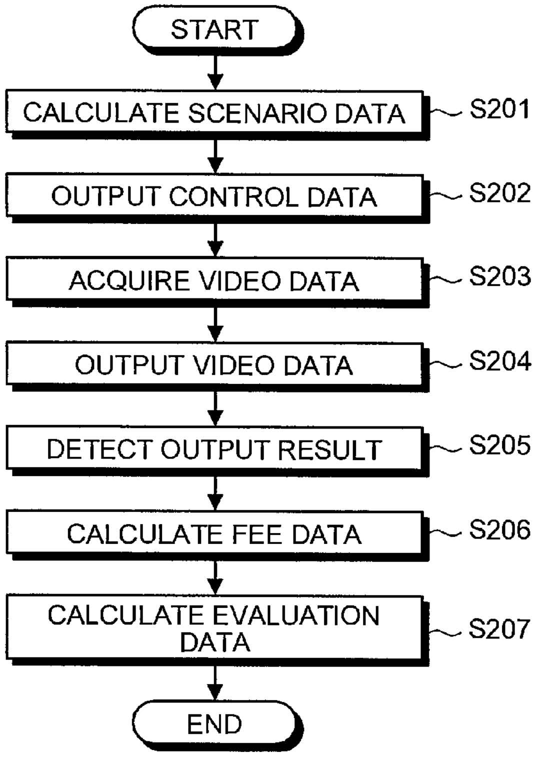
FIG. 2 is a flowchart of a process of the video distributing apparatus.

FIG. 2 is a flowchart of a process of the video distributing apparatus. The process shown in FIG. 2 is as follows. Editing data is calculated based on scenario data having described therein information concerning the contents of a program (step S201). At step S201, the editing data may be calculated based on rule data having described therein progress rules for the contents of the program.

Control data to control the camerawork of a camera is output to a control apparatus to control the camera based on the calculated editing data (step S202). At step S202, the control data is not limited to the one that is output to the control apparatus. For example, when the video distributing apparatus and the camera are provided being communicable with each other, the control data may be output to the camera.

The video data shot by the camera is selectively acquired based on the editing data calculated at step S201 (step S203), and the acquired video data is output to an external viewer (step S204). In this case, when a plurality of cameras is used, the video data shot by the camera controlled based on the control data output at step S202 may be acquired at step S203.

When plural cameras are used, at step S203, once all of the video data shot by the cameras is acquired by the video distributing apparatus; based on the editing data, corresponding video data may be selectively acquired from the video data by the video distributing apparatus; and the selected video data may be output to the external viewer. At step S203, the corresponding video data may be selectively acquired from the video data shot by the cameras based on the editing data at the step of acquiring the video data by the video distributing apparatus.

Thereafter, the output result of the video data at step S204 is detected (step S205). Based on the detected detection result, fee data concerning a usage charge corresponding to the output video data is calculated (step S206). At step S206, for example, fee data concerning charges billed to a subscriber who has a viewing apparatus that receives the video data may be calculated corresponding to the type and the amount of the output video data. At step S206, for example, fee data concerning the copyright royalty paid to the copyright owner of the program that is the origin of the output video data may be calculated.

Finally, evaluation data for the video data output at step S204 is calculated (step S207). The evaluation data acquired at step S207 may be in the form of, for example, comments input by the user such as "It was a very nice performance." and "The audio was poor in the latter half of the performance." The evaluation data acquired at step S207 can be used for, for example, control of the camerawork thereafter, in terms of operation. Although omitted from the figure, for example, at step S207, evaluation data in the form of, for example, a scaled rating using digits may be acquired. In this case, the acquired evaluation data can be counted. Thereby, the counted result of the evaluation data may be automatically reflected in the control data output at step S202.

As described above, according to the embodiment, editing data concerning the contents of the video data of the program is calculated based on scenario data having described therein information concerning the contents of the program and, based on the calculated editing data, the video data shot by the camera installed at a fixed position is selectively acquired. The acquired video data is output to an external viewer. Therefore, video data corresponding to the demand of each user can be easily acquired without requiring equipment and personnel to switch the shooting angles of the camera and the video shot by the camera can be edited. Therefore, a reduction in the production cost of the video data can be facilitated.

Therefore, the user can, for example, inexpensively watch the video of a regular performance that has not been produced for reasons that the number of those who would like to watch it is few, etc., or is expensive to watch because the production cost thereof is high. The user can watch the video of the regular performance at camera angles corresponding to user demand. Furthermore, the user can watch the video of the regular performance in real time starting simultaneously with the start of the performance.

According to the embodiment, the editing data is calculated based on reservation data having described therein information concerning a filming reservation. Therefore, a person operating the distributing system, etc., can calculate the editing data without personnel engaged in the calculation of the editing data. Thereby, similarly, the video of the regular performance can be watched at camera angles corresponding to user demand.

According to the embodiment, the control data is output to the camera or the control apparatus that controls the camera and the video data shot by the camera that is controlled based on the output control data is acquired. Thereby utilizing the advantages of communication through a communication network such as a network, for example, the video data corresponding to the demand of each user can be easily acquired without securing personnel to switch the shooting angles of the camera.

According to the embodiment, the editing data is calculated based on the rule data having described therein the progress rules of the contents of the program. Therefore, when the user does not know well the rules upon which progression of the contents of the program are based, the user can watch an optimal video that follows the progress rules of the contents of the program.

According to the embodiment, the output result of the video data is detected and, based on the detected result, the fee data concerning the usage charge corresponding to the output video data is calculated. Therefore, the user can be charged properly corresponding to the amount and the contents of the video that the user has watched. More specifically, for example, when reception of the output video data has begun, but the contents differ from that expected by the user causing the user to stop the reception after a short period, the user can be charged less than that of a user who has received the video data from the beginning to the end. Thereby, proper charges corresponding to the usage state of a user can be executed utilizing the advantages of communication through a communication network.

In addition, according to the embodiment, the control data that controls the camera is output based on the evaluation data for the output video data. Therefore, in the next session and subsequent sessions, video data that securely reflects the evaluation by the user can be output and video data corresponding more precisely to the demands of the user can be output utilizing the advantages of the communication through a communication network.

Furthermore, in the embodiment, when the editing data is metadata, improvement of usability of the video distributing apparatus can be facilitated. According to the embodiment, by using plural cameras, video data for which the shooting angles are switched by each camera can be selectively acquired and video data corresponding more closely to the demands of each user can be easily acquired.

EXAMPLE

Referring to the accompanying drawings, description will be given in detail for an example of a video distributing apparatus, a video distributing method, a video distributing program, and a recording medium according to the present invention. However, description is omitted for the elements that overlap in terms of the contents thereof with the above embodiment.

Figure 3:
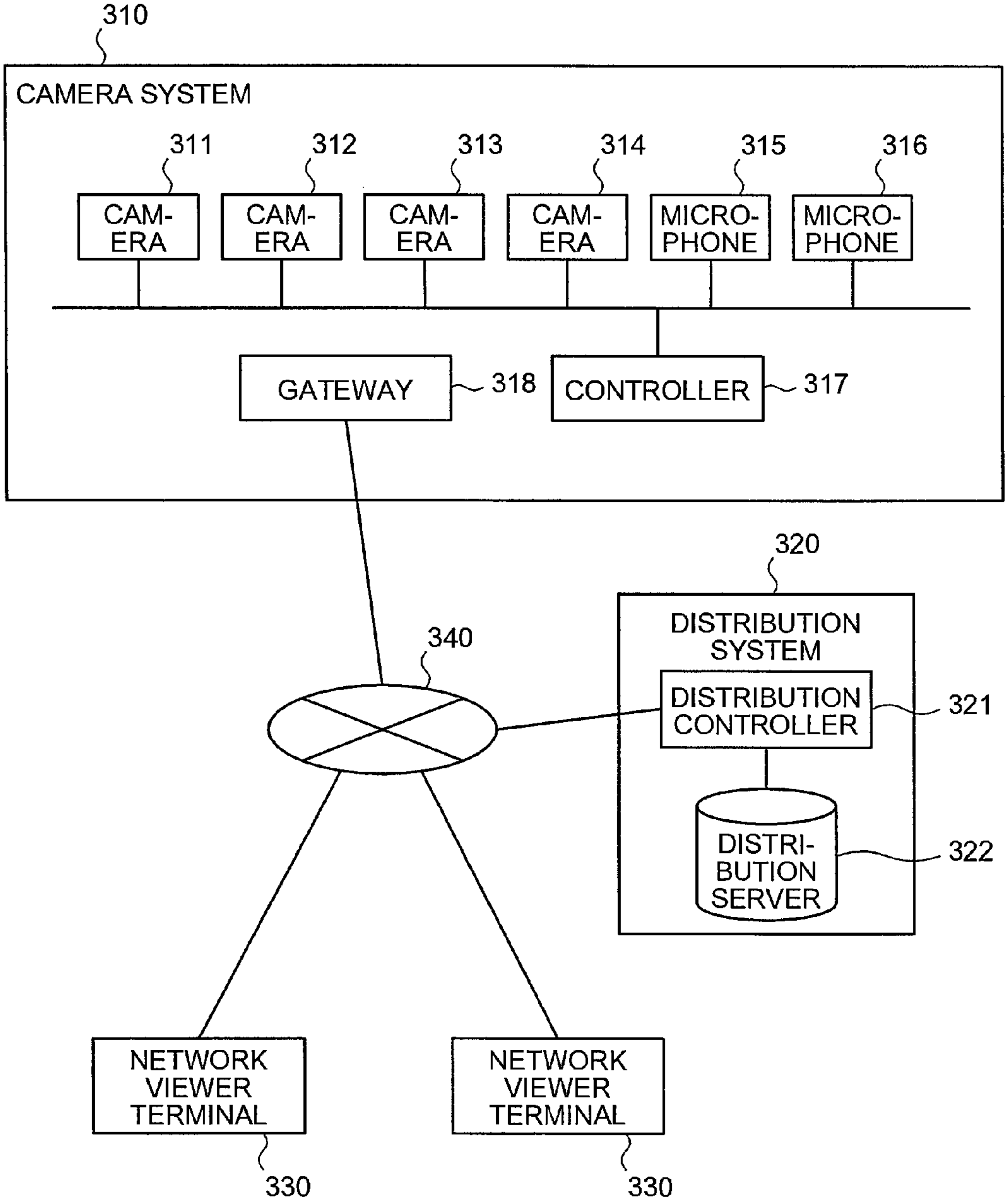
FIG. 3 is a block diagram of a camera/distribution system in according to an example.

FIG. 3 is a block diagram of a camera/distribution system according to the example. The camera/distribution system includes a camera system 310, a distributing system 320, and a network viewer terminal 330. The camera system 310, the distributing system 320, and the network viewer terminal 330 are communicably connected to each other through a network 340.

The camera system 310 includes plural cameras 311 to 314 respectively installed at fixed positions, plural microphones 315 and 316, a controller 317, and a gateway 318. In the example, description will be given for the camera system 310 that shoots a video in a club offering live performance of music. In the example, although description will be given for the camera system 310 that includes the cameras 311 to 314 in plural, the number of cameras is not limited to a plurality and may be one. Similarly, in the example, although description will be given for the camera system 310 that includes the microphones 315 and 316 in plural, the number of microphones is not limited to a plurality and may be one.

The cameras 311 to 314 are respectively installed at different positions in the club. Each of the cameras 311 to 314 shoots a video in a range that can be shot from the position at which the camera is installed. The range that can be shot is a range that can be shot using the functions of zooming, panning, and tilting at each of the cameras 311 to 314. Various types of known cameras may be used as the cameras 311 to 314. Detailed drawings and description concerning the configuration and functions of the cameras 311 to 314 are omitted in the example as the cameras are a known technology.

The microphones 315 and 316 are respectively installed at different positions in the club. The microphones 315 and 316 collect the sound around the microphones 315 and 316 and convert the collected sound into electric signals. The microphones 315 and 316 may be provided being integrated in cameras 311 to 314 or may be provided separately therefrom. Various types of known microphones 315 and 316 may be used as the microphones 315 to 316. Detailed drawings and description concerning the configuration and functions of the microphones 315 to 316 are omitted in the example as the microphones are a known technology.

The controller 317 controls the operations of the cameras 311 to 314. The controller 317 controls, for example, the start and stop of shooting by each of the cameras 311 to 314. The controller 317 adjusts, for example, zooming, panning, and tilting for each of the cameras 311 to 314. The controller 317 acquires the videos that have been shot respectively by the cameras 311 to 314 and includes a storing unit not shown that stores the shot videos.

The controller 317 acquires the sound collected by the microphones 315 and 316 and stores the acquired sound synchronizing the video shot by the cameras 311 to 314 therewith. The controller 317 outputs data of the stored videos and sound to a distribution controller 321 through the gateway 318, and controls the cameras 311 to 314 and the microphones 315 and 316 based on the data output from the distribution controller 321 in the distributing system 320. In addition, the controller 317 outputs the program metadata (see FIG. 7) to the distribution controller 321 through the gateway 318.

The controller can be realized by, for example, a common personal computer not shown, etc. Detailed drawings and description of the configuration and functions of a common personal computer are omitted in the example as the common personal computer is a known technology. The controller 317 may include programs, user interfaces, etc., to enable creation by a user (personnel of the club) of metadata of the program.

The gateway 318 adjusts between the controller 317 and an external apparatus outside the camera system 310, the communication between the external apparatus and the controller 317. For the communication between the controller 317 and the external apparatus, the gateway 318 mutually converts data using different media and protocols on the network 340. More specifically, in the example, the gateway 318, for example, outputs data output from the controller 317 to the distributing system 320 and outputs the data output from the distributing system 320 to the controller 317.

Although detailed description is omitted as the gateway 318 is a known technology, the gateway 318 recognizes all layers of an OSI (Open Systems Interconnection) reference model, assimilates the differences among communication media and transmission schemes, and, thereby, enables connections between different types of apparatuses. The OSI reference model is a model showing the communication functions that a computer should have dividing the functions into layer configurations, based on the design policy, "OSI" of the network configuration to realize data communication between different types of apparatuses. In the OSI reference model, the communication functions are divided into seven layers and standard function modules are defined for each layer.

The distributing system 320 includes the distribution controller 321 and a distributing server 322. The distribution controller 321 communicates with the controller 317 in the camera system 310 through the network 340 and the gateway 318. The distribution controller 321 communicates with the network viewer terminal 330 through the network 340. The distribution controller 321 executes various processes based on the data output from the controller 317 and the network viewer terminal 330 and outputs data based on those processes to the controller 317 and the network viewer terminal 330. The distribution controller 321, for example, creates a program table based on scenario metadata (see FIG. 9). The scenario metadata and the program table will be described hereinafter.

The distributing server 322 stores various types of data to provide services that the camera/distribution system realizes. The distributing server 322 stores, for example, the video data output from the controller 317 and the program metadata (see FIG. 7). In this case, the video data includes moving image data and audio data. The distributing server 322 stores the program table created by the distribution controller 321 based on the program metadata output from the controller 317. This program table can be viewed from the network viewer terminal 330 by operation at the network viewer terminal 330. In addition, the distributing server 322 stores the scenario metadata (see FIG. 9), the editing metadata (see FIGS. 18 and 19), the distribution metadata (see FIGS. 20, 21, and 24), management metadata (see FIG. 26), etc.

The distribution controller 321 can be realized by, for example, a common personal computer, etc. As the common personal computer is a known technology similarly to the above controller 317, detailed drawings and description of the configuration and functions of the common personal computer to implement the distribution controller 321 are omitted herein. The distributing server 322 can be implemented by any of various types of known server computers used as a server of an Internet provider. As for the server computer, similarly, detailed drawings and description of the configuration and functions of thereof are omitted as the server computer is a known technology.

The network viewer terminal 330 includes a communication unit that communicates with the distribution controller 321 through the network 340. The network viewer terminal 330 acquires, for example, the program table stored in the distribution controller 321 using the communication unit. In this case, the program table shows a list of video data that the distributing system 320 can distribute, and includes information to the extent that a user who uses the network viewer terminal 330 can grasp the title of each video data and an outline of the contents of the program of each video data using the information.

The network viewer terminal 330 includes a user interface to designate a program that the user (network viewer), based on the acquired program table, desires to watch. The network viewer terminal 330 includes a display, speakers, neither of which is shown, etc., to watch the data acquired from the distribution controller 321. The network viewer terminal 330 can be implemented by, for example, a common personal computer, etc. Similarly to the above controller 317 and the distribution controller 321, detailed drawings and description of the configuration and functions of the common personal computer to implement the network viewer terminal 330 are omitted as the common personal computer is known technology.

Figure 4:
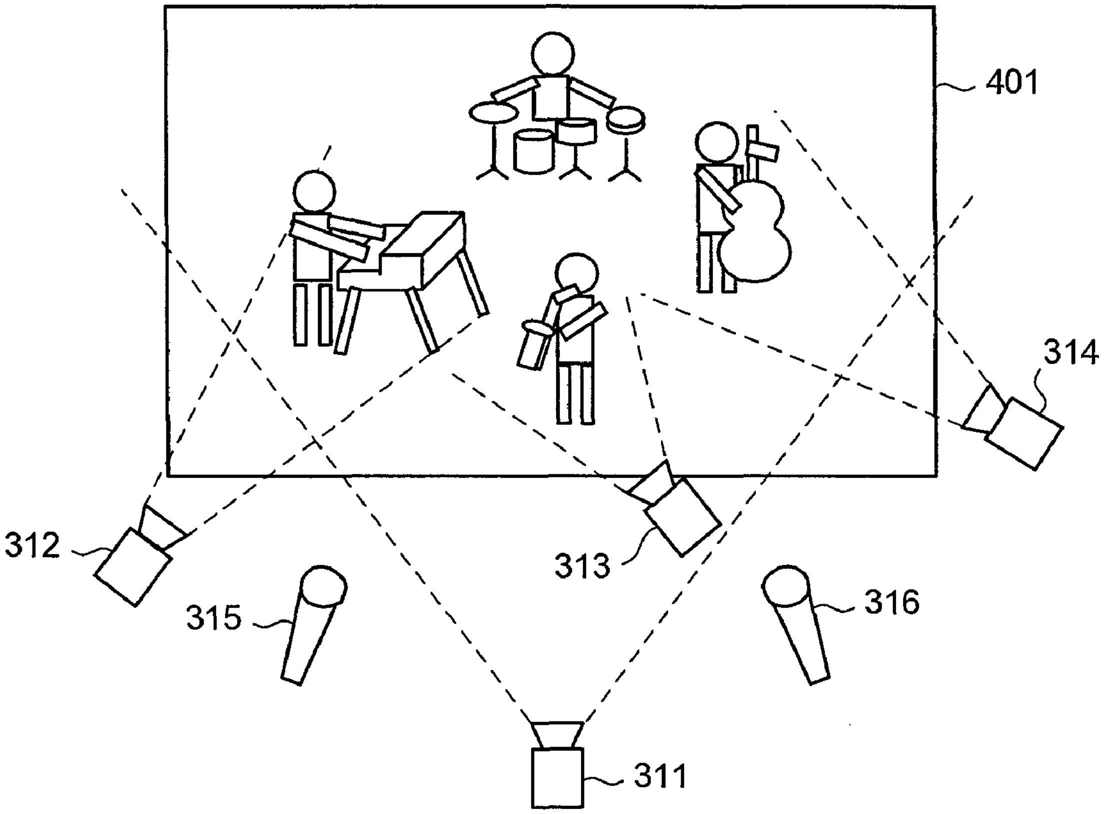
FIG. 4 is a diagram of an exemplary arrangement of cameras and microphones in the club.

FIG. 4 is a diagram of an exemplary arrangement of the cameras and microphones in the club. In FIG. 4, the exemplary arrangement is shown for the case in which a band constituted of four members who respectively play instruments of a saxophone, a musical keyboard, a contrabass, and drums is to be filmed. In the example, a performance during which the members, etc., do not move very much is to be filmed. The subject of filming is not limited to a performance during which the movement of the performers, etc., is minimal.

In the example, description is given with the assumption that the entire performance of a play, a theatrical performance, etc. at a theater that holds performances regularly, a live musical performance such as jazz and rock music at a club, a concert at a concert hall, etc., (hereinafter, "regular performance") is a stage and a performance program actually performed on each stage is a program. The regular performance is, for example, a stage public entertainment that newly generates no production cost.

For example, as shown in FIG. 4, in an example of a live performance of jazz music in a club, a stage is a continuous sequence from the start to the end (or an intermission) of a live performance and every one song performed on the stage is a program. The stage is a unit of a continuous sequence into which plural programs are included. Hereinafter, in the example, description will be given taking an example of a stage having two partial stages. It is assumed that three programs of programs 1 to 3 are performed on a first partial stage 1 of the two partial stages.

The camera 311 is disposed at a position at which the camera 311 can film the entire stage. In the example, a physical place for the band members to perform is a stage 401 and description will be given distinguishing the stage 401 from the above stage. The camera 312 is disposed at a position at which the camera 312 mainly films a keyboard player. The camera 313 is disposed at a position at which the camera 313 mainly films a saxophone player. The camera 314 is disposed at a position at which the camera 314 mainly films a contrabass player. The microphones 315 and 316 are respectively disposed at positions at which the microphones 315 and 316 collect sound respectively from the stage right and the stage left.

Figure 5:
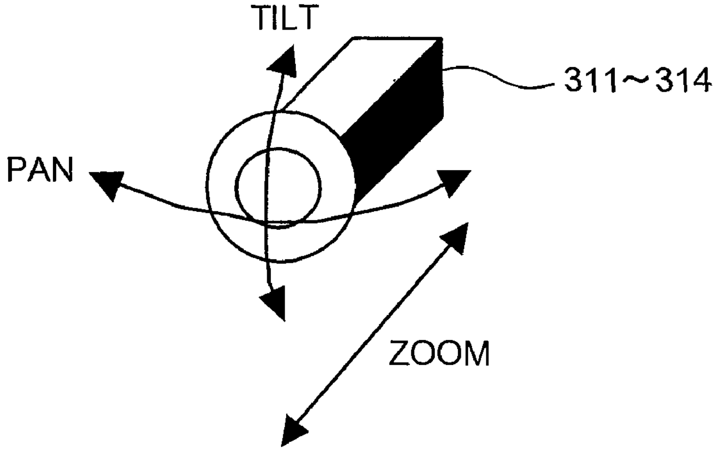
FIG. 5 is a diagram for explaining operation of the cameras.

FIG. 5 is a diagram for explaining operation of the cameras. Zooming, panning, and tilting can each be adjusted for each of the cameras 311 to 314. The zooming adjustment refers to adjustment by which each of the cameras 311 to 314 adjusts enlarging/shrinking of the image being shot. The panning adjustment refers to adjustment by which each of the cameras 311 to 314 adjusts the shooting position thereof in the horizontal direction. The tilting adjustment refers to adjustment by which each of the cameras 311 to 314 adjusts the shooting position thereof in the vertical direction.

Figure 6:
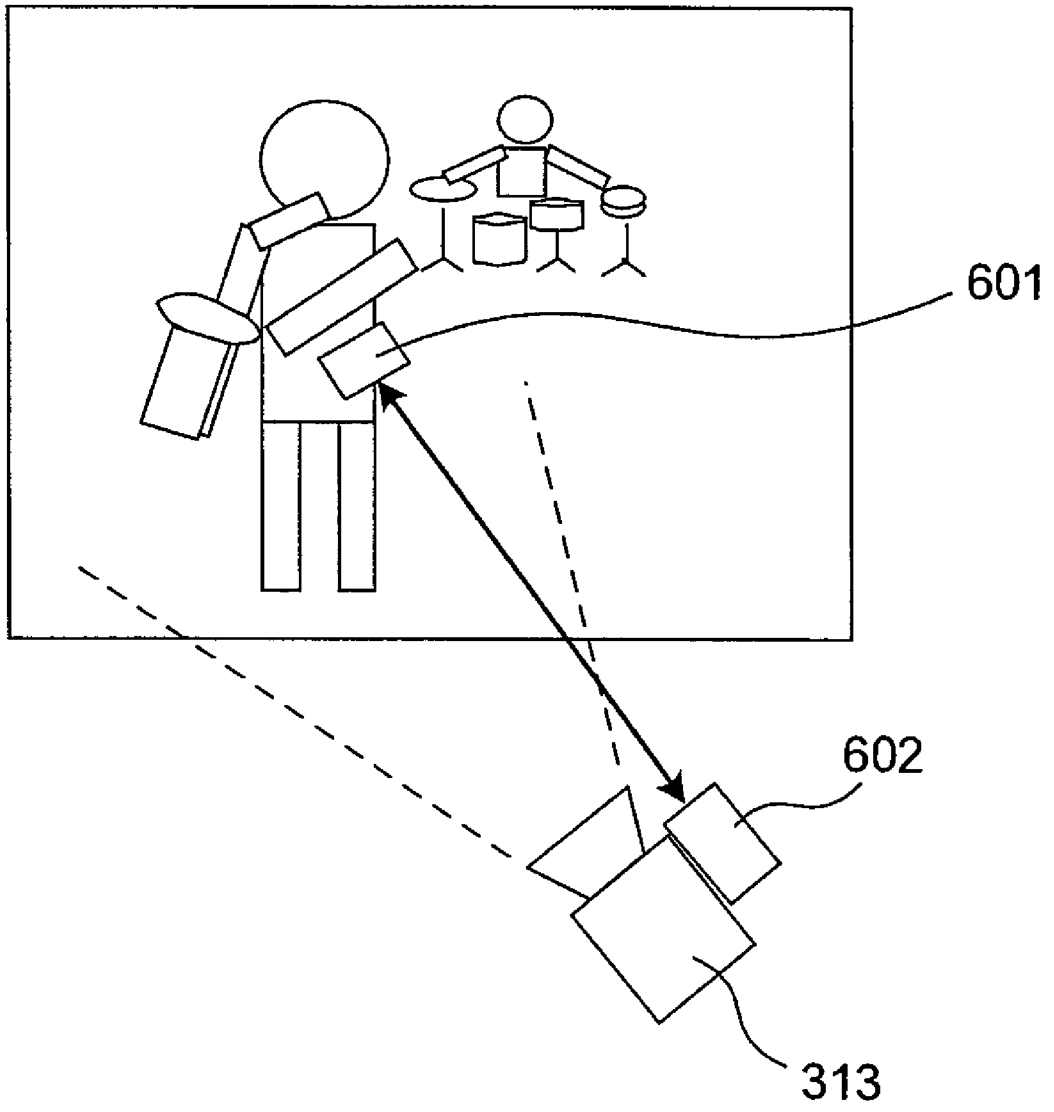
FIG. 6 is a diagram for explaining an example of a method of using the cameras.

FIG. 6 is a diagram for explaining an example of a method of using the cameras. In FIG. 6, an example of the method of using the cameras for the case where each of the cameras 311 to 314 is caused to have directivity is shown. According to the method shown in FIG. 6, an RF tag 601 is used. Although detailed drawings are omitted, the RF tag 601 is a plate (tag) having imbedded therein a storage medium using a non-contact IC chip and an antenna. The storage medium of the RF tag 601 is caused to store information of each player and the RF tag 601 is attached to each member.

The information stored in the storage medium of the RF tag 601 is read by a reading apparatus 602 that includes an antenna. The reading direction of the reading apparatus 602 is caused to have directivity and is interlocked with the shooting direction of the cameras 311 to 314 (the camera 313 in FIG. 6). Therefore, the players can be automatically identified. That is, a specific player can be automatically filmed using this. The technique used in the RF tag 601 is an automatic recognition system called RFID (Radio Frequency IDentification). By using the RF tag 601, a specific player can be identified within ranges respective of a desired distance and directivity.

FIG. 7 is a diagram for explaining an example of the program metadata. The program metadata 700 is data which describes information concerning the contents of a program to be filmed. The data described as the program metadata 700 is, for example, DB root data 701, program metadata ID data 702, scenario metadata ID data 703, or performance contents data 704.

It is assumed that the program metadata 700, for example, is created by club personnel in advance before the start of a stage (live performance) and is output to the distribution controller 321 (or may be submitted on a paper sheet). The DB root data 701 identifies a database (in the example, the distribution controller 321, the distributing server 322, etc.) that is the distribution origin (transmission origin) of the contents described by the program metadata 700.

The program metadata ID data 702 identifies the program metadata itself. The scenario metadata ID data 703 identifies the scenario metadata (see FIG. 9) created based on the program metadata 700. The performance contents data 704 can be various pieces of data that respectively indicate the date and the time of the performance, the genre ID, the category, the DB, the venue information, the performers, the charge, an introduction, the number of stages, the contents of each stage, etc.

Each of the program metadata ID data 702, the scenario metadata ID data 703, and the performance contents data 704 is correlated with data that identifies a database that stores the data. Hereinafter, although description is omitted, each piece of data described in the program metadata is correlated with a database (hereinafter, "DB") that is the reference origin of the data when necessary.

In the performance contents data 704, the genre ID data identifies the genre of the stage that is the origin of the contents described by the program metadata 700. In the performance contents data 704, the category data identifies the category that includes the stage that is the origin of the contents indicated by the program metadata 700. In the performance contents data 704, the genre/category selected from a genre/category DB (see FIG. 8) are described as genre/category data.

In the performance contents data 704, the venue information data is information concerning a venue (place) at which the program is performed such as, for example, the name of a club. In the performance contents data 704, the performer data is data that indicates the band members, i.e., the players of the instruments.

FIG. 8 is a diagram for explaining the genre/category DB. The genre/category DB 800 is constituted of plural category DBs respectively provided for each genre. FIG. 8 shows a category DB that is categorized in the genre of music. The category DB shown in FIG. 8 is constituted of a category area 801, an average song length area 802, an instrumental solo area 803, an average solo length area 804, a number of solos area 805, a movement area 806, a talking area 807, and a scenario area 808.

The category area 801 stores the category data that indicates the category. The average song length area 802 stores the average time length of one song of the songs categorized into each category. The instrumental solo area 803 stores the presence or absence of solo playing parts of each of the instruments. The average solo length area 804 stores the average time length of each solo playing. The solo number area 805 stores the number of times of solo playing. The movement area 806 stores the degree of the movement of the players. The talking area 807 stores the degree of talking such as the frequency and the length of the talks on the stage. The scenario area 808 stores whether the scenario that is the base is followed. The scenario that is the base, for example, can be acquired from the data described by the program metadata 700, etc.

FIG. 9 is a diagram for explaining an example of scenario metadata. The scenario metadata 900 is data concerning the contents of the video data of the program contents. The scenario data 900 is calculated based on the program metadata 700. The scenario metadata 900 is calculated based on the rule data that describes the progress rules of the contents of the program. The rule data is provided in advance for the distributing server 322, etc. The scenario metadata 900 is data having described therein DB root data 901, program metadata ID data 902, scenario metadata ID data 903, camera setting data 904, and playing contents data 905.

The program metadata ID data 902 identifies the program metadata 700 that is the basis of the scenario metadata 900. The scenario metadata ID data 903 identifies the scenario metadata 900 itself. It is assumed that the scenario metadata 900 is calculated in advance before the start of the stage (live performance) based on the program metadata 700 output from the controller 317.

The camera setting data 904 identifies how and which camera in the camera system 310 is operated. For the camera setting data 904, the evaluation data for the video data may be acquired from the network viewer terminal 330 and the data 904 may be described based on the acquired evaluation data. The playing contents data 905 can be various pieces of data that respectively indicate the genre/category, the date and the time of the performance, information concerning the place, the performers, the number of stages, the contents of the program, learning, etc. In the playing contents data 905, the performer data is described in more detail than the performer data in the program metadata 700.

In the embodiment, to describe the performer data in more detail than the program metadata 700, it is assumed that detailed performer data is provided in advance before the start of the stage (live performance) separately from the program metadata 700 by the user (the club personnel) of the club. The exemplary description of the scenario data 900 is not limited to that shown in FIG. 9. Only items in a portion of the editing data shown in FIG. 9 may be used or may be new editing data attached with another tag such as, for example, <ANOTHER TAG 1="...">. Description of description that is same as the scenario data is omitted.

In the playing contents data 905, style data for each item is described in each of items, <STAGE> and <PROGRAM>. The style data is data that shows how each stage or program is performed or played. In the example, the style selected from the style DB (see FIG. 15) is described.

FIG. 10 is a diagram for explaining a camera setting DB. A camera setting DB 1000 includes a camera setting ID area 1001, a camera ID area 1002, operation areas 1003 to 1005, and a subject area 1006. The camera setting ID area 1001 can set the operation condition of each of the cameras by designating a camera setting ID. The camera ID area 1002 stores the camera ID data. The operation areas 1003 to 1005 stores data that indicates the operation condition of each camera identified by the camera ID. The operation condition of the camera is set using the zooming, the panning, and the tilting. The subject area 1006 stores data that indicates a subject to be shot by each camera identified by the camera ID.

For example, the camera setting 1 in the camera setting DB 1000 shown in FIG. 10 is a setting that enables switching of the camera 311 in three steps. "−" and "+" in the operation area 1003 to set the zooming represent respectively to retreat from (shift to a wider angle) and to get closer to the object to be shot. "−" and "+" in the operation area 1004 to set the panning represent respectively to swing the shooting direction either rightward or leftward. "−" and "+" in the operation area 1006 to set the tilting represent respectively to swing the shooting direction either upward or downward.

FIG. 11 is a diagram for explaining an inst DB. An inst DB 1100 is constituted of an inst ID area 1101, an inst name area 1102, and a member ID area 1103. The inst ID area 1101 stores inst ID data that identifies the instrument to be played. The inst name area 1102 stores the name of the instrument to be played. The member ID area 1103 stores member ID data of the member who plays each instrument. The term, "Inst" is used herein to mean "instrument"=musical instrument.

Figure 12:
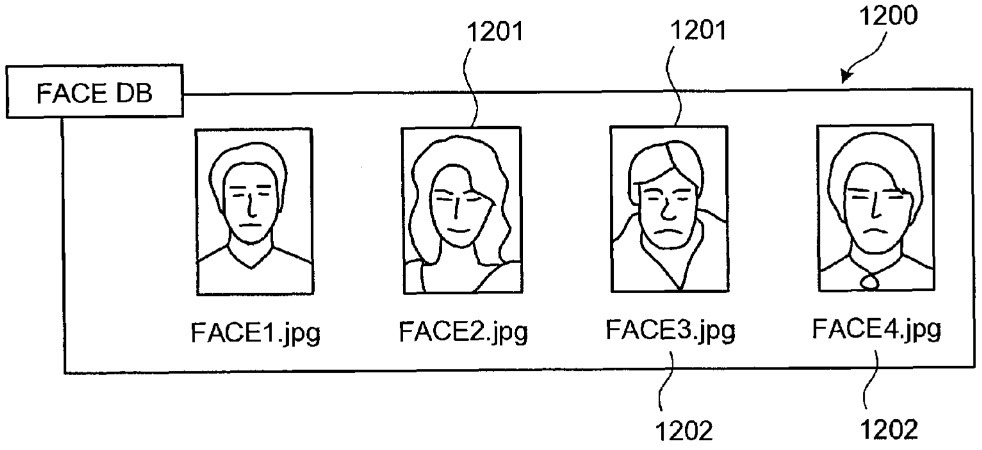
FIG. 12 is a diagram for explaining a face DB.

FIG. 12 is a diagram for explaining a face DB. A face DB 1200 is constituted of image data 1201 indicative of the faces of the performers and identifying data 1202 that identifies each image data 1201. The identifying data 1202 in the face DB 1200 may be, for example, file names of each image data 1201.

Figure 13:
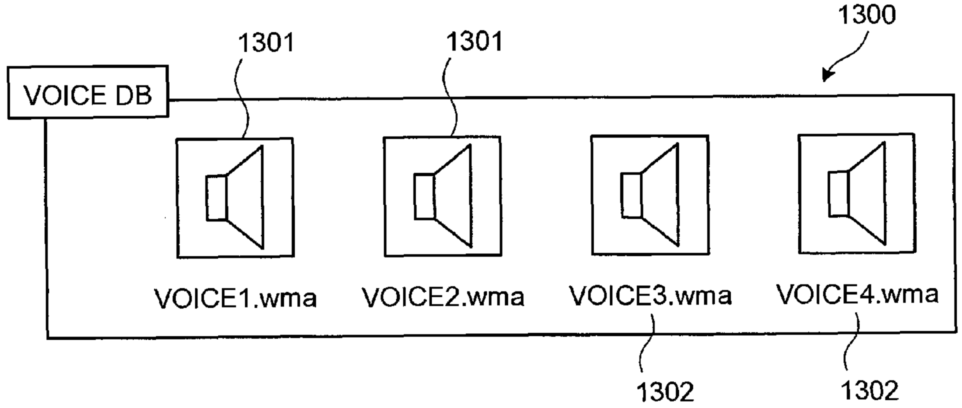
FIG. 13 is a diagram for explaining a voice DB.

FIG. 13 is a diagram for explaining a voice DB. A voice DB 1300 is constituted of voice data 1301 indicative of the voices of the performers and identifying data 1302 that identifies each voice data 1301. The identifying data 1302 in the voice DB 1300 may be, for example, file names of each voice data 1301.

Figure 14:
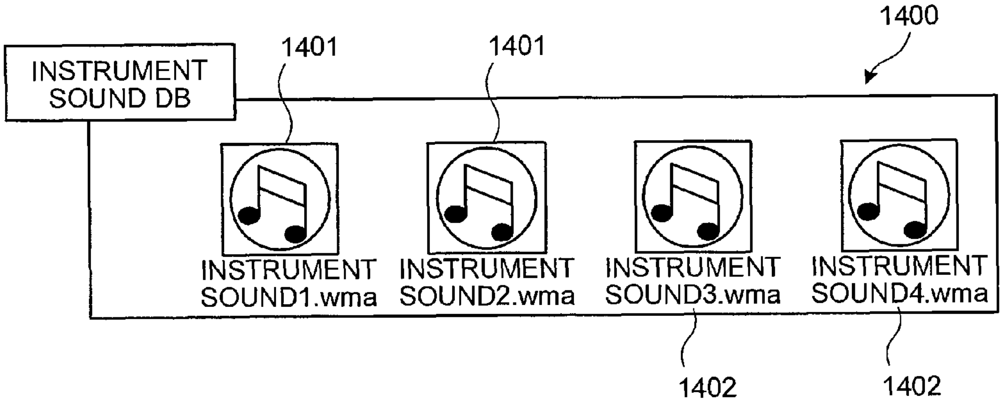
FIG. 14 is a diagram for explaining an instrument sound DB.

FIG. 14 is a diagram for explaining an instrument sound DB. An instrument sound DB 1400 is constituted of instrument sound data 1401 indicative of the instrument sounds and identifying data 1402 that identifies each instrument sound data 1401. The identifying data 1402 in the instrument sound DB 1400 may be, for example, file names of each instrument sound data 1401.

Though the case has been described where the face DB 1200, the sound DB 1300, and the instrument sound DB 1400 are provided for each stage in the example, the case is not limited hereinto. For example, a face DB, and a sound DB or instrument sound DB (none shown) respectively store image data of the faces, and sound data of the voices of the performers who are expected to perform or sound data of the instruments to be played may be created in advance and data that identifies these DBs may be described. Thereby, a DB does not need to be created for each performance and, therefore, extra labor for the case of performers who frequently perform can be expected to be saved.

FIG. 15 is a diagram for explaining a style DB. A style DB 1500 includes a style ID area 1501 and a style area 1502. The style ID area 1501 stores style ID data that identifies a style. The style area 1502 stores style data that indicates the playing style identified by each style ID data. The playing style can be identified by designating a style ID. More specifically, identification of a playing style, enables the timing of camera switches and designation of the cameras 311 to 314 to be switched, etc., to be identified.

FIG. 16 is a diagram for explaining a learning DB. A learning DB 1600 is constituted of a learning ID area 1601, an average song length area 1602, a instrumental solo area 1603, an average solo length area 1604, a number of solos area 1605, a movement area 1606, a talking area 1607, and a scenario area 1608.

The learning ID area 1601 stores learning ID data that identifies a learning ID. The average song length area 1602 stores the average playing time for one song in the stage. The instrumental solo area 1603 stores the presence or absence of solos for each instrument in the stage. The average solo length area 1604 stores the average playing time of the solo when the stage includes an instrumental solo. The number of solos area 1605 stores the number of solos in the stage.

The movement area 1606 stores the degree of the movement of the performers in the stage. In the example, the degree of movement is set at the "intermediate" degree as the playing of jazz music is the stage. However, for example, the degree of move is set at the "low" degree when the stage is classical music playing, or the degree of move is set at the "high" degree when the stage is rock music playing.

The talking area 1607 stores the degree of talking in the stage. The amount of talking may be set, for example, according to the ratio of the length of the talking to that of playing music. The scenario area 1608 stores data indicating whether the stage actually performed has followed the scenario that was set prior to the actual performance of the stage, referring to the program metadata 700 and the scenario metadata 900. The learning DB 1600 is updated with new contents or is updated when necessary based on the editing metadata (see FIG. 18) described later, etc. When video data of the same or a similar stage is acquired, etc., the categories can be set by identifying the learning ID.

FIG. 17 is a diagram for explaining a copyright DB. FIG. 17 shows a copyright DB concerning music. A copyright 1700 is constituted of a copyright ID area 1701, a song title area 1702, a composer area 1703, a lyricist area 1704, an arranger area 1705, and a production year area 1706. The copyright ID area 1701 stores copyright ID data attached to each song. The song name area 1702 stores a song name identified by the copyright ID. The composer area 1703 stores composer name data. The lyricist area 1704 stores the name of the lyricist. The arranger area 1705 stores the name of the arranger. The production year area 1706 stores year data of the production of each song.

FIG. 18 is a diagram for explaining an example of editing metadata. Editing metadata 1800 is calculated by the distribution controller 321. The editing metadata 1800 is described using the scenario metadata 900 as the reference origin and is described about video data formed by editing the video data shot by the camera system 310 according to the scenario data 900. The editing metadata 1800 is data having described therein the DB root data 901, the program metadata ID data 902, the scenario metadata ID data 903, editing metadata ID data 1801, program contents data 1802, etc.

The editing metadata ID data 1801 identifies the editing metadata 1800 itself. The program contents data 1802 can be, for example, data indicating the number of stages and the specific edited contents. The data indicating the edited contents can be data for setting the switching of camera angles to film the members and the instruments, and these pieces of data are described respectively in the lines of <MEMBER ANGLE> and <INSTRUMENT ANGLE>. In the program contents data 1802, lines are provided to be described in detail with the starting time and the ending time of each stage, the number of programs in the stage, the starting time and the ending time of each program, etc. In the line of <NUMBER OF STAGES> in the program contents data 1802, the contents transferred from the scenario metadata 900 are basically described. However, when the number of stages in the live performance actually performed is increased or decreased compared to the number of stages scheduled in advance, the actual number of stages is described as the stage number data.

FIG. 18 shows the editing metadata 1800 obtained when editing is conducted for one stage in two manners (Editing 1 and Editing 2). Program contents data 1802*a*, which is the Editing 1, includes the contents obtained when the angles to shoot the band members and the instruments are set as the standard. As indicated by the program contents data 1802*a* of the Editing 1, standard camera angle switching is executed for the shooting when the "standard" editing angles are set. The "standard" editing angles are set, for example, when no designation is especially issued.

In the program contents data 1802, for the stage starting time, the starting time for a first stage (settings for a first playing) is described before the playing starts. In the program contents data 1802, the ending time is described after the stage has ended. In the line of <TIME> in the program contents data 1802, the time for which the player has actually taken his/her solo. The time data in the editing metadata 1800 may be described after the stage to be shot has ended or be described concurrently with the progress of the stage. For example, when the distribution scheme of the video contents is a streaming type, the time data is described in parallel with the progress of the stage or after the stage has ended. When the distribution scheme of the video contents is a server type, the time data may be described in parallel with the progress of the stage or be described after the stage has ended.

According to the editing metadata 1800 shown in FIG. 18, in the lines of <STAGE> and <PROGRAM> in the scenario metadata 900, the order of instrumental solos can be acquired based on the style data described for each program. The average time length of each solo can be acquired based on the genre/category DB data in the scenario metadata 900.

In the editing metadata 1800 shown in FIG. 18, the data acquired from the scenario metadata 900 and a determination result of determining whether the video data acquired matches this data (hereinafter, simply "matching") are described. In the example, it is assumed that the determination of matching is executed at a timing corresponding to when the cameras 311 to 314, i.e., the angles, are switched. The determination of matching enables determination as to whether the intended switching of the cameras 311 to 314 and actual switching of the cameras 311 to 314 is correctly performed. In FIG. 18, in the line of <MAIN>, "true" is described when the video data matches. The main data is described in parallel with the progress of the stage or after the stage has ended.

More specifically, the determination of matching is executed, for example, by a comparison of the image data of the faces of the players in the image data 1201 acquired from the face DB 1200 based on the scenario metadata 900, and the video data shot by the cameras 311 to 314 in the camera system 310. Description is omitted concerning the clipping of the image data of the face portion from the video data, analysis of the clipped image data and the image data acquired from the face DB 1200, and determination of the similarity based on the analyzed image data, as these are known techniques.

More specifically, the determination of matching may be executed by, for example, comparing the sound data such as the sound data 1301 acquired from the sound DB 3100 based on the scenario metadata 900, and the voices of the performers in the video data shot by the cameras in the club. Description is omitted concerning the technique to extract the sound data such as the voices of the performers from the sound data as this is a known technique, such as sound recognition. Whether the video data matches can be determined using the instrument sound DB 1400.

The program contents data 1802*b* of the Editing 2 is data that is described for editing that is executed handling mainly camera angles for a specific player (in this case, member 2). Which instrument is the instrument of member 2 can be acquired based on the inst DB 1100. The program contents data 1802*b* of the Editing 2 is described according to electronic reservation data in electronic reservation made by a subscriber using the network viewer terminal 330.

Whether editing is executed handling mainly the camera angles for a specific player or editing is executed overall at standard angles can be designated according to the information described as <MEMBER ANGLE> and <INSTRUMENT ANGLE>. In the line of <MAIN> in the program contents data 1802*b* of the Editing 2, similarly to the program contents data 1802*a* of the Editing 1, "true" is described when the designated camera angles and the solo player shot coincide, and "false" is described when the two do not coincide.

Figure 19:
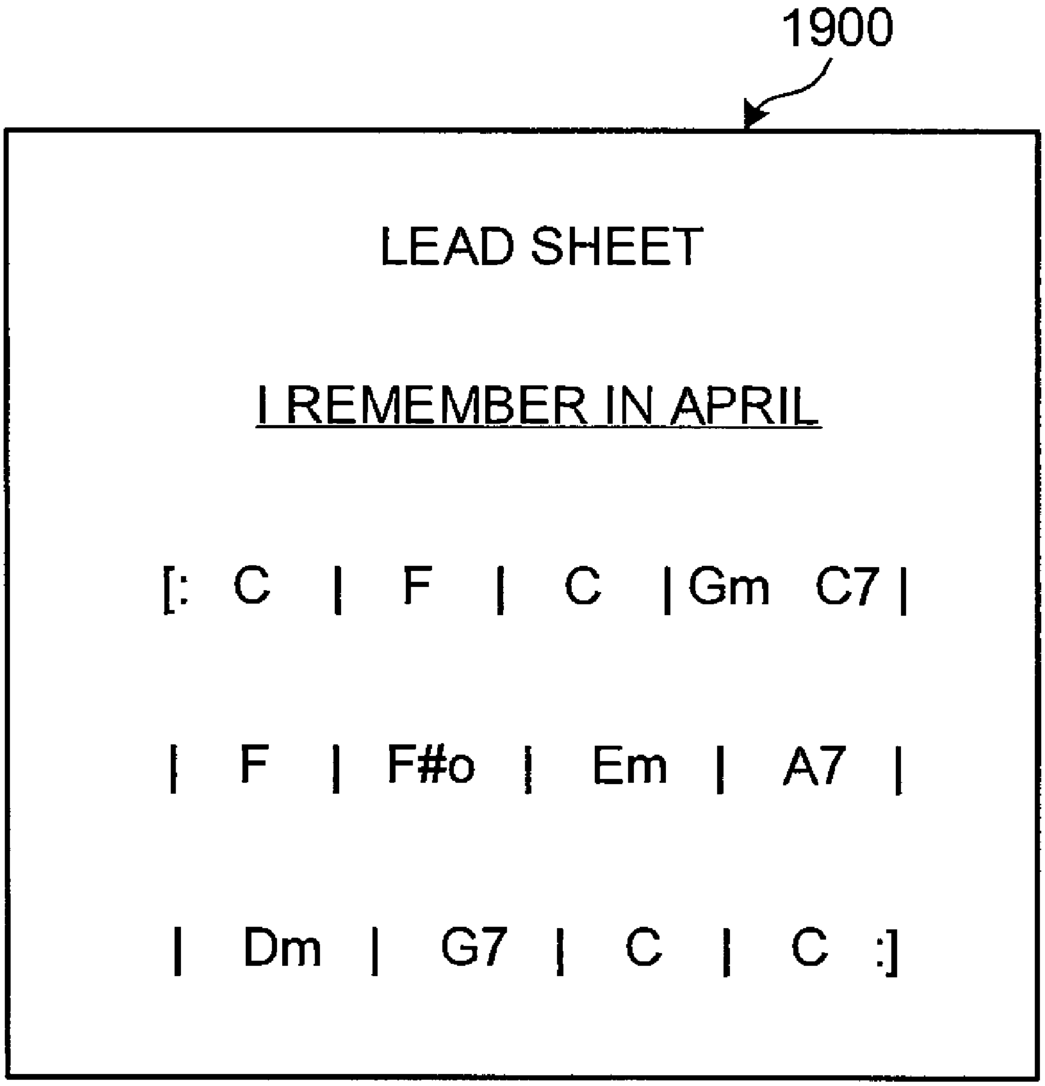
FIG. 19 is a diagram for explaining a lead sheet that supports creation of editing data.

FIG. 19 is a diagram for explaining a lead sheet that supports the creation of the editing data. The lead sheet is described in the same format as that of a score having described thereon chords of the sound of the instruments. The lead sheet is an item generally used for playing ad lib parts in jazz music. In FIG. 19, the symbols such as "C", "F", and "Gm" are chord symbols that each uniquely determine a chord.

During a live performance, an ad lib player starts playing following the chords from the one at the upper-left position of FIG. 19, plays the ad lib part for a time length of an integral multiple times of a unit (chorus) on the lead sheet, ends the playing with the chord at the lower-right position of FIG. 19, and turns the playing over to the next player. Therefore, when data corresponding to <TIME=" . . . " is described in a line of <PROGRAM> in <STAGE 1> of <Editing 1> in the editing metadata 1800, determining matching may also be executed by detecting the chords on the lead sheet 1900 in addition to the methods of using the face DB 1200, the sound DB 1300, and the instrument sound DB 1400.

In this case, a sound recognition unit that can recognize the chords is used. For example, the chord symbols on the lead sheet are converted into an electronic signal and the signal is read by the distribution controller 321. The determination is executed by extracting the sound (instrument sound) from the video data in the corresponding time period. Description concerning the sound recognizing unit is omitted as this unit can be realized using a known sound recognition technique.

FIG. 20 is a diagram for explaining an example of distribution metadata. The distribution metadata 2000 shown in FIG. 20 shows the state before the video data is distributed to the network viewer terminal 330. The distribution metadata 2000 is calculated based on the editing metadata 1800.

The distribution metadata 2000 is recorded in the distributing server 322 or the distribution controller 321. The distribution metadata 2000 is not transmitted to the network viewer terminal 330. For distributing the video contents, the distribution metadata 2000 itself is not distributed. While the distribution data is in the distributing server 322, the video and the sound data that have been switched by the distributing system 320 according to the distribution data are distributed. The distribution metadata 2000 is calculated for each stage and each network viewing terminal 3320.

The distribution metadata 2000 is data having described therein the DB root data 901, the program metadata ID data 902, the scenario metadata ID data 903, the editing metadata ID data 1801, distribution metadata ID data 2001, distribution subscriber data 2002, distribution contents data 2003, editing-content data 2004, entrance and exiting data 2005, fee data 2006, etc. The distribution metadata ID data 2001 identifies itself.

The distribution subscriber data 2002 is data concerning the network viewer terminal 330 that is the distribution destination of the video data or the user who owns the network viewer terminal 330. The distribution subscriber data 2002 can be, for example, viewer ID data and password data. Evaluation and comments for the distributed video may be described as the distribution subscriber data 2002.

In the example, the evaluation, the comments, etc., are the distribution subscriber data 2002 as data input from the user interface of the network viewer terminal 330 is described after viewing the video data. The lines to respectively describe <EVALUATION> and <COMMENT> are left blank prior to the distribution of the video data. The method of describing in the <EVALUATION> and <COMMENT> lines in the distribution subscriber data 2002 is not particularly limited and the description thereof is omitted herein as description can be realized using various known techniques.

The contents to be described in <EVALUATION> may be selected from given options set by the distributing system 320, or an arbitrary evaluation may be described by the user. An arbitrary comment is described by the user in the <COMMENT> line. In addition, subscriber preference data concerning the preferences of the subscriber is described in the distribution subscriber data 2002. The subscriber preference data may be described, for example, prior to the distribution of the video contents based on the past viewing.

In the distribution contents data 2003, the quality of the distributed video data (in FIG. 20, "contents"), the distribution scheme of the video data, etc., are described. The distribution contents data 2003 is described based on the electronic reservation data for the electronic reservation executed at the network viewer terminal 330.

In the lines of <MEMBER ANGLE> and <INSTRUMENT ANGLE> in the editing-content data 2004, data that defines the switching of the camera angles is described. In FIG. 20, the distribution metadata 2000 obtained when the standard setting is selected is shown in the lines of <MEMBER ANGLE> and <INSTRUMENT ANGLE>.

The editing-content data 2004 in the example is described according to the program contents data 1802*a* of the Editing 1 in the editing metadata 1800. When the video data output based on the distribution metadata 2000 is distributed by streaming, the lines for pieces of data that can not be known before the output of the video data, such as time data indicating the playing time is completed, are all blank at the start of the output. For streaming-type distribution, the time data is described in real time associated with the progress of the stage. On the other hand, for server-type distribution, the line for time is already described as the order of the videos to be distributed has been already determined. <TIME> that is described in the distribution metadata 2000 is the real time obtained when a live performance is actually conducted.

The real time is, for example, the standard time in Japan (Japan Standard Time). Japan Standard Time can be acquired by receiving the standard electromagnetic wave carrying the time information sent from the standard electromagnetic wave transmission base, using an antenna for an electromagnetic wave clock, etc. The technique, etc., to correct the time based on the time information carried on the standard electromagnetic wave is known in, for example, the technology of the electromagnetic wave clock and, therefore, description thereof is omitted herein. The time code for the real time described in <TIME> is recorded simultaneously with the shooting of the video and the sound.

The entrance and exiting data 2005 is data concerning the viewing state of the distributed video data. Because reception of the distributed video data can be regarded as entrance to the club, the entrance and exiting data 2005 may be described, for example, corresponding to the connection state of the line between the distribution controller 321 and the network viewer terminal 330.

The fee data 2006 is data calculated according to an equation separately defined based on the program information and the entrance and exiting information. The equation to perform the fee calculation is data arbitrarily set by the distributing system personnel and the description thereof is omitted. More specifically, for example, the fee data is data calculated based on the type and the amount of the distributed video data. The amount of the distributed video can be calculated based on, for example, the entrance and exiting data 2005. The type of the distributed video data can be calculated based on, for example, the communication quality for the distribution of the video. More specifically, the fee data 2005 is calculated such that the fee charged for high quality video data is higher than that for lower quality video data.

The <EVALUATION> and the <COMMENT> lines, the entrance and exiting data 2005, and the fee data 2006 in the distribution subscriber data 2002 are not yet described prior to the output of the video data to the network viewer terminal 330. The <EVALUATION> and the <COMMENT> lines, the entrance and exiting data 2005, and the fee data 2006 are described after the stage has ended when the output format of the video data is either of the server type or the streaming type.

FIG. 21 is a diagram explaining an example of the distribution metadata. The distribution metadata 2000 of FIG. 20 shows the state before the viewing whereas the distribution metadata 2100 shown in FIG. 21 shows the state at the time when viewing has ended. The distribution metadata 2100 is described by adding <EVALUATION>, <COMMENT>, <ENTRANCE AND EXITING>, and <CHARGES> to the distribution metadata 2000. <SUBSCRIBER PREFERENCES> in the distribution metadata 2100 shown in FIG. 21 is updated based on the contents of the past viewing state and the contents of the immediately preceding video contents.

As to the <EVALUATION>, the <COMMENT>, and the <ENTRANCE AND EXITING>, these lines may be described based on the data that a subscriber inputs using the user interface on the network viewer terminal 330 or may be described based on the data concerning the behavior of the subscriber. For example, the expression and the cheer of a subscriber who is watching a video are detected and the detection result is handled as the data concerning the behavior of the subscriber. More specifically, when an emotion or laughter is detected, it is determined that the user is enjoying the live performance and the <EVALUATION> line may be described based on the determination result.

Figure 22:
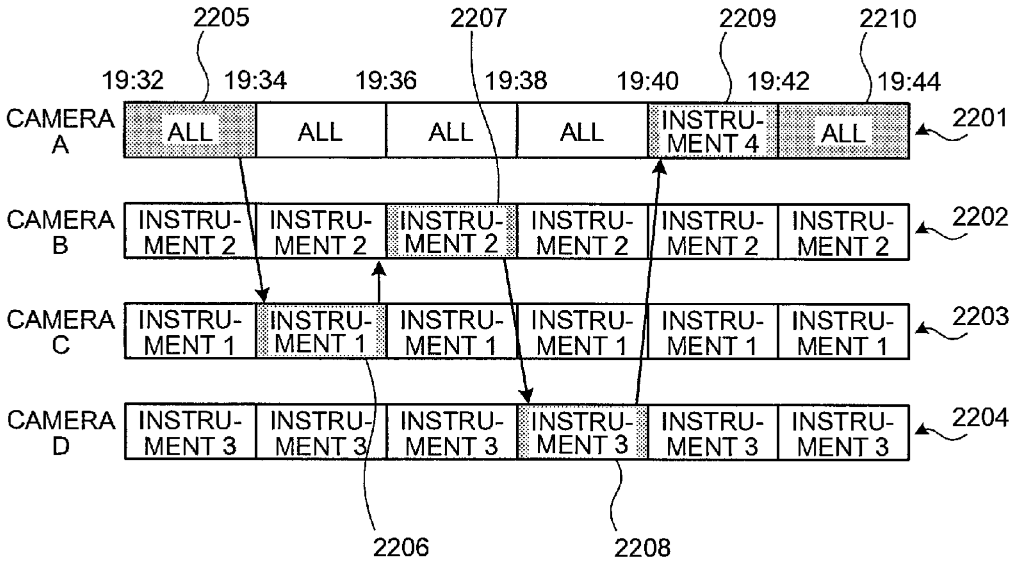
FIG. 22 is a diagram for explaining a switching of video data.
Figure 23:
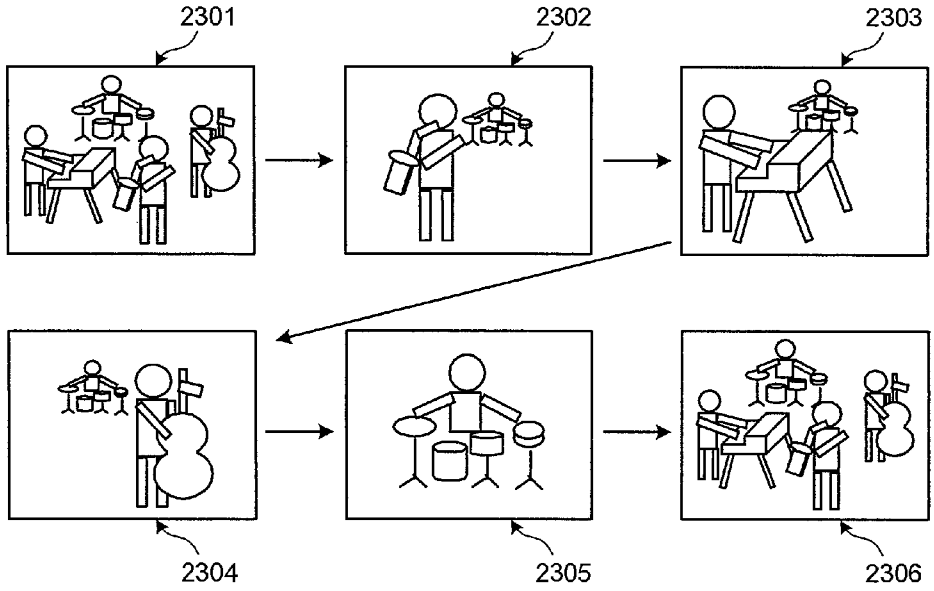
FIG. 23 is a diagram for explaining a reproduced image of the video data.

FIG. 22 is a diagram for explaining the switching of video data. In FIG. 22, pieces of video data 2201 to 2204 respectively shot by the cameras 311 to 314 and pieces of video data 2205 to 2210 that are output to the network viewer terminal 330 are shown. In FIG. 22, the direction of the time axis is from the left to the right. The pieces of video data 2205 to 2210 are switched sequentially over time according to the distribution metadata 2100 shown in FIG. 21. FIG. 23 is a diagram for explaining a reproduced image of the video data. Images 2301 to 2306 shown in FIG. 23 are obtained when the pieces of video data 2205 to 2210 are switched as indicated in FIG. 22 and played on the network viewer terminal 330.

FIG. 24 is a diagram for explaining an example of the distribution metadata. Distribution metadata 2400 show in FIG. 24 is described according to the program contents data (see 1802*b* in FIG. 18) of the Editing 2. The distribution metadata 2400 has additionally described therein the distribution subscriber data 2002, the distribution contents data 2003, the editing-content data 2004, the entrance and exiting data 2005, the fee data 2006, etc.

Figure 25:
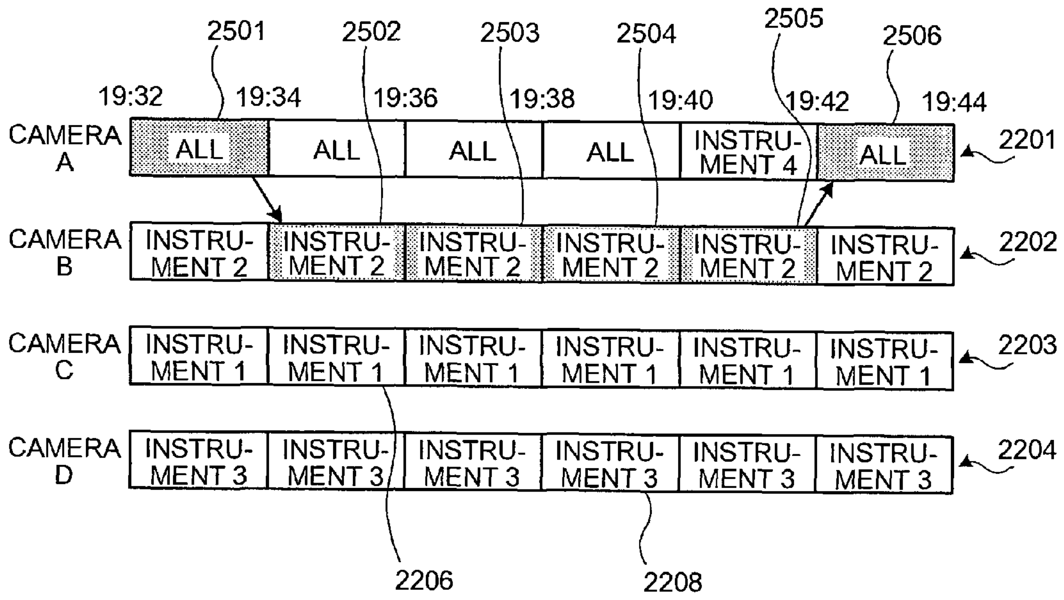
FIG. 25 is a diagram for explaining the switching of the video data.

FIG. 25 is a diagram for explaining the switching of the video data. In FIG. 25, the pieces of video data 2201 to 2204 shot by the cameras 311 to 314 and pieces of video data 2501 to 2506 that are output to the network viewer terminal 330 are shown. The pieces of video data 2501 to 2506 are sequentially switched over time according to the distribution metadata 2400 shown in FIG. 24.

FIG. 26 is a diagram for explaining an example of the management metadata. Management metadata 2600 is data that manages a result of viewing at the network viewer terminal 330 that has reproduced the video data of the corresponding stage or the subscriber who owns the network viewer terminal 330. The management metadata 2600 is described based on the pieces of distribution metadata 2100 and 2400 obtained after the viewing of the contents.

The management metadata 2600 is data having described therein the DB root data 901, the program metadata ID data 902, the scenario metadata ID data 903, the editing metadata ID data 1801, distribution viewer data 2601, evaluation data 2602, comment data 2603, fee data 2604, copyright data 2605, viewing rate data 2606, etc.

The distribution viewer data 2601 is data concerning the network viewer terminal 330 that receives the distribution of the video data or a subscriber who owns the network viewer terminal 330. The evaluation data 2602 is data concerning evaluation acquired from the network viewer terminal 330 that receives the distribution of the video data. In FIG. 26, evaluation results of a subscriber who owns the network viewer terminal 330 and selects evaluation data from among evaluation data corresponding to a scaled rating indicated by digits.

The comment data 2603 is data that indicates comments acquired from the network viewer terminal 330. The fee data 2604 is data calculated based on the fee data 2006 in the pieces of distribution metadata 2100 and 2400 respectively for the network viewing terminals 330. The copyright data 2605 is data calculated based on the output state of the video data. The viewing rate data 2606 is data concerning the viewing rate and is calculated based on the number of outputs of the video data. As the viewing rate data 2606 is calculated based on, for example, an equation, etc., arbitrarily set by the distributing system personnel, description concerning the calculation of the viewing rate data 2606 is omitted herein.

FIG. 27 is a diagram for explaining the schematic sequence of processes or work in the camera/distribution system in the example. In FIG. 27, time progresses downward. The sequence of the processes or work in the camera/distribution system starts with creating the program metadata 700 in the camera system 310 (see 1 of the column, "order of processes or work" in FIG. 27). The program metadata 700 may be directly created by the club personnel, etc., or may be created by converting the contents of the program that the club personnel, etc., has described on a paper sheet into an electronic signal by the distributing system personnel, etc. The created program metadata 700 is stored in the distributing server 322.

In the distributing system 320, the scenario metadata 900 is created based on the created program metadata 700 and the program table is calculated based on the created scenario metadata 900 (see 2 of the column, "order of processes or work" in FIG. 27). This work may be executed by the distributing system personnel or may be automatically calculated by the distribution controller 321. The subscriber makes an electronic reservation on the network by accessing the distribution controller 321 using the network viewer terminal 330 and referring to the program table. As a result, electronic reservation data is created. The created electronic reservation data is output to the distribution controller 321 (see 3 of the column, "order of processes or work" in FIG. 27).

For making the electronic reservation, the owner (user) of the network viewer terminal 330 acquires the program table data from the distribution controller 321 using an appropriate user interface. The acquired program table data is displayed on a displaying unit in the network viewing terminal in the form of, for example, the television program table inserted in a newspaper, etc. For acquiring the program table data, a viewer ID and a password may be assigned to each network viewer terminal 330 and the program table data may be transmitted only to the network viewer terminal 330 that is permitted by authentication using the viewer ID and password. As a result, at the time of making the electronic reservation, the network viewer terminal 330 can be identified.

The network subscriber refers to the program table and sets the program that is desired to be view, the communication quality for viewing the program, the communication scheme, camera angles, etc. These settings are made by, for example, selecting a corresponding option from multiple options prepared in advance in the distributing server 322, etc. More specifically, for example, for setting the communication quality, any one of rank A (high image quality on a high speed line), rank B (intermediate image quality on an intermediate speed line), and rank C (low image quality on a low speed line) is selected corresponding to the state of the network line. For setting the communication scheme, either of viewing methods is selected, the streaming type for viewing the video of the live performance in real time or the server type for viewing the video that has been shot in advance and is stored in the distributing server 322.

For setting the camera angle, either the standard camera angle or the camera angle for primarily shooting a specific person or instrument is selected. When a plurality of band members and instruments are present, any of the persons or instruments is also selected.

In the distributing system 320, the corresponding scenario metadata 900 is acquired based on the contents of the electronic reservation made by the subscriber and the acquired scenario metadata 900 is output to the controller 317 in the camera system 310 (see 4 of the column, "order of processes or work" in FIG. 27). In the camera system 310 acquiring this scenario metadata 900, various settings such as the setting of the camera angle are made based on the acquired scenario metadata 900 (see 5 of the column, "order of processes or work" in FIG. 27). Thereafter, the camera system 310 waits for the actual performance of the program to start. When the actual performance starts, the camera system 310 shoots the program according to the editing metadata 1800 and outputs the shot video data to the distribution controller 321 (see 6 of the column, "order of processes or work" in FIG. 27).

The distributing system 320 calculates the editing metadata 1800 (see 7 of the column, "order of processes or work" in FIG. 27). The distributing system 320 calculates the distribution metadata 2000 based on the calculated editing metadata 1800, and outputs the video data to the network viewer terminal 330 based on the calculated distribution metadata 2000 (see 8 of the column, "order of processes or work" in FIG. 27). In 8 of the column, "order of processes or work" in FIG. 27, the pieces of distribution metadata 2100 and 2400 may be calculated. The subscriber plays the received video data on the network viewer terminal 330 and views the played video. The user inputs the data of evaluation and comments for the viewed video data and outputs the input data to the distribution controller 321 (see 9 of the column, "order of processes or work" in FIG. 27).

The distributing system 320 updates the editing metadata 1800 and the pieces of distribution metadata 2100 and 2400 based on the evaluation and the comments received from the network viewer terminal 330, and calculates the management metadata 2600 (see 10 of the column, "order of processes or work" in FIG. 27). The above is the sequence of the processes and the work in the camera system and distributing system 320 in the example.

Figure 28:
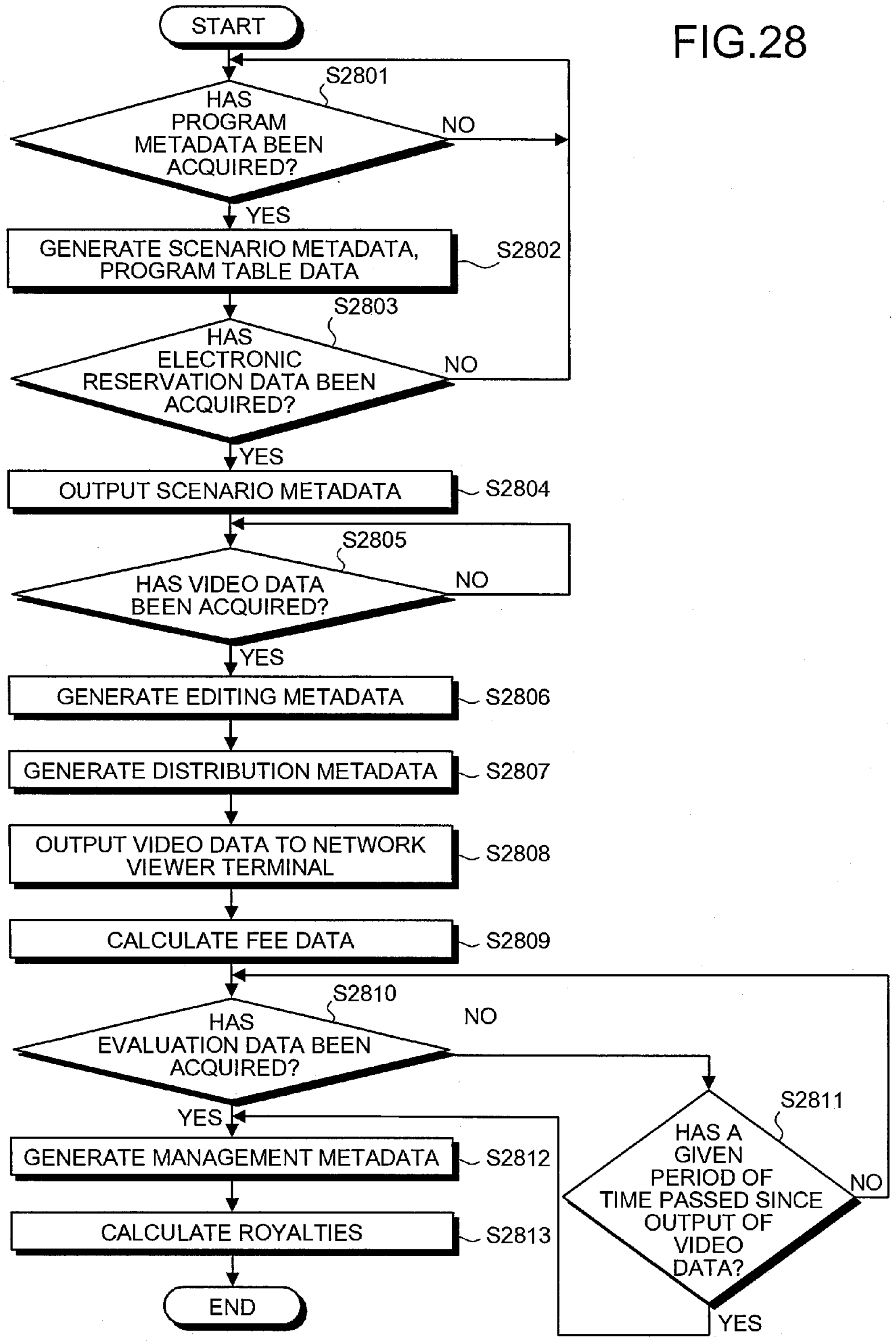
FIG. 28 is a flowchart of a process that the distribution controller executes.

FIG. 28 is a flowchart of the process that the distribution controller executes. The process shown in FIG. 28 first determines whether the program metadata 700 has been acquired (step S2801). At step S2801, the program metadata 700 may be acquired by, for example, receiving the data 700 output from the controller 317 of the camera system 310, or may be acquired by input of the data 700 by the distributing system personnel. When it is determined that the program metadata 700 has not been acquired (step S2801: NO), the process waits on standby.

When it is determined that the program metadata 700 has been acquired (step S2801: YES), the scenario metadata 900 and the program table data are calculated based on the acquired program metadata 700 (step S2802). In the example, the description has been given for an example where the distributing server 322 calculates the scenario metadata 900 based on the program metadata 700. However, the calculation is not limited hereinto. The scenario metadata 900 may be that created by the distributing system personnel or may be that created by the club personnel.

Whether the electronic reservation data has been acquired is determined (step S2803). When it is determined that the electronic reservation data has not been acquired (step S2803: NO), the process proceeds to step S2801. When it is determined that the electronic reservation data has been acquired (step S2803: YES), the corresponding scenario metadata 900 is output to the controller 317 based on the acquired electronic reservation data (step S2804).

Thereafter, the process is on standby until it is determined that the video data concerning the output scenario metadata 900 has been acquired (step S2805: NO). When it is determined that the video data concerning the output scenario metadata 900 has been acquired (step S2805: YES), the editing metadata 1800 is calculated based on the scenario metadata 900 output at step S2804 and the video data acquired at step S2805 (step S2806).

The distribution metadata 2000 is calculated based on the editing metadata 1800 calculated at step S2806 (step S2807) and the video data acquired at step S2805: YES, is output to the corresponding network viewer terminal 330 based on the calculated distribution metadata 2000 (step S2808). The fee data is calculated based on the output result of the video data output at step S2808 (step S2809). The fee data calculated at step S2809 is calculated for each network viewer terminal 330.

Whether the evaluation data for the video data output at step S2808 has been acquired is determined (step S2810). When it is determined that the evaluation data has not been acquired (step S2810: NO), whether a predetermined time has been elapsed since the video data has been output is determined (step S2811). When it is determined that the predetermined time has not elapsed since the video data has been output (step S2811: NO), the process proceeds to step S2810.

When it is determined that the evaluation data has been acquired (step S2810: YES), the management metadata 2600 is calculated based on the acquired evaluation data (step S2812). At step S2812, the management metadata 2600 is calculated based on all pieces of data that can be acquired at the time when the management metadata 2600 is calculated. When it is determined that the predetermined time has elapsed since the video data has been output (step S2811: YES), the process proceeds to step S2812 at which the management metadata 2600 is calculated based on all pieces of data that can be acquired at the time when the management metadata 2600 is calculated excluding the contents concerning the evaluation data.

In addition, the royalty data is calculated based on the management metadata 2600 calculated at step S2812 (step S2813). At step S2813, for example, the royalty data may be calculated based on the number of times the video data has been distributed.

Figure 29:
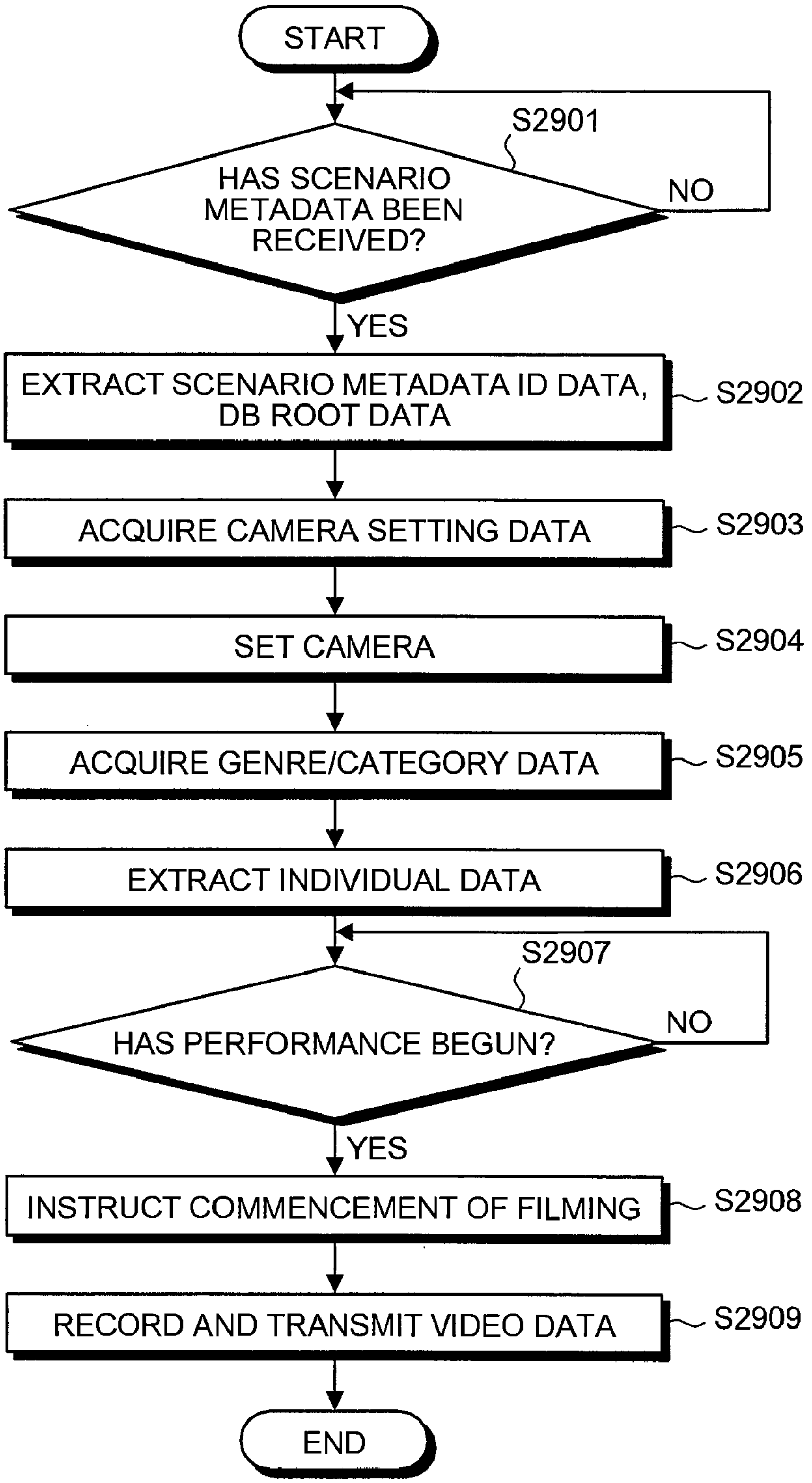
FIG. 29 is a flowchart of a procedure executed by the controller.

FIG. 29 is a flowchart of the procedure executed by the controller. According to the process shown in FIG. 29, whether the scenario metadata 900 has been received is determined (step S2901). When it is determined that the scenario metadata 900 has been received (step S2901: YES), the scenario metadata ID data 903 and the DB root data 901 are extracted from the received scenario metadata 900 (step S2902).

The corresponding camera setting data 904 is acquired based on the extracted scenario metadata ID data 903 and the DB root data 901 (step S2903) and the setting of each of the cameras 311 to 314 in the camera system 310 is made based on the acquired camera setting data 904 (step S2904). At step S2903, more specifically, the camera setting data 904 and the camera setting DB data are extracted from the scenario metadata 900 identified based on the scenario metadata ID data 903 and the DB root data 901. The corresponding setting data is acquired from the camera setting DB 1000 based on the extracted camera setting data 904 and the camera setting DB data.

At step S2904, the settings for the zooming, the panning, the tilting angles of the cameras 311 to 314 in the club are made based on the acquired camera setting data 904. At step S2904, when plural camera IDs are present for one camera such as, for example, "camera 311-0", "camera 311-1", and "camera 311-2", the camera ID having the smallest digit (camera 311-0) is selected as the initial setting. For example, when each member has the RF tag 601 and the cameras 311 to 314 each have an RF reception function with directivity, whether the relation of settings between the cameras 311 to 314 and the members are correctly executed may be checked.

The genre/category data is acquired (step S2905). At step S2905, more specifically, the genre/category data and the genre/category DB data are extracted from the scenario metadata 900 identified based on the scenario metadata ID data 903 and the DB root data. The corresponding setting data is acquired from the genre/category DB 800 based on the extracted genre/category data and the genre/category DB data.

Thereby, information concerning the average playing time of one song, the presence or absence of a solo for each instrument, the average playing time of the solo, the number of solos (in the case of a saxophone, a piano, a base guitar, and drums, the number of solos is four), the degree of the movement of the players while playing, the amount of talking (introduction of members and chatting) between the playing, and whether the scenario has been followed (performed nearly according to the scenario) or not followed (many exceptions included) is read. The data concerning the amount of movement of the members during the playing can be used for the processing executed when one of the members gets out of the shooting range of a camera.

Similarly, individual data is extracted (step S2906). The individual data includes the number of members who perform, the name of each member, whether the member is the leader, the instrument name that each member plays, each member's face (image data), each member's voice (real voice) data, the instrument sound to be referenced when an instrument being played is recognized using the sound thereof (data), the number of stages, the number of programs in each stage (stage 1, stage 2, . . . ); the song title, the style, and the copyright (related information) of each program (program 1, program 2, . . . ); etc. At step S2906, the DB data corresponding to the individual data to be acquired is extracted based on the editing data and the corresponding setting data is acquired from the DB identified based on the extracted DB data.

Thereafter, the process is on standby until it is determined that the playing has started (step S2907: NO), At step S2907, for example, whether the playing has started may be determined by determining whether it is the starting time, or by determining whether a start key, etc., provided in advance is operated. In addition, at step S2907, for example, the sound (real voice) of a person for whom leader="true" from the scenario metadata 900 may be recognized using the sound from the microphones 315 and 316 and this recognition may be employed as the sign of the start.

When the playing has started (step S2907: YES), data instructing the start of shooting is output to the cameras 311 to 314 (step S2908). In FIG. 29, "instruct commencement of filming" is indicated as the processing at step S2908. Each of the cameras 311 to 314 starts to shoot according to the instruction to start shooting from the controller 317. The controller 317 records the video data shot by each of the cameras 311 to 314 in a storing apparatus in the controller 317 and, simultaneously, transmits this video data to the distributing server 322 (step S2909).

At step S2909, for example, in the case of the streaming type, the distribution controller 321 establishes a three-way connection with the network viewer terminal 330 that has made the electronic reservation and the controller 317 in the camera system 310 at the time 30 minutes before the start of the performance and, thereby, creating a communication-ready state. The establishment of the connection in this case refers to the state where the distribution controller 321, the controller 317, and the network viewer terminal 330 are logically authenticated and are connected. At step S2907, the process is on standby for the live performance to start being in this state. In the case of the server type, as the contents are already present in the server, a transmission instruction is waited for.

As described above, according to the embodiment, the video data shot by the cameras 311 to 314 respectively installed at fixed positions is selectively acquired based on the editing metadata 1800 calculated based on the scenario metadata 900, and the acquired video data is output to the network viewer terminal 330 based on the pieces of distribution metadata 2000, 2100, and 2400.

Therefore, by creating in advance the scenario data 900, video data corresponding to the demands of each subscriber can be easily acquired without requiring the equipment and personnel to switch the camera angles and edit the shot video. Therefore, reduction of the production cost of the video data can be facilitated.

As a result, the user can, for example, inexpensively watch the video of a regular performance that has not been produced due to reasons that the number of those who would like to watch it is few, etc., or is expensive to watch as the production cost thereof is high. In addition, the subscriber can watch the video of the regular performance at camera angles corresponding to the demands of the subscriber. Furthermore, the subscriber can watch the video of the regular performance in real time starting simultaneously with the start of the actual performance.

According to the example, the editing metadata 1800 is calculated based on the data of the electronic reservation made on the network viewer terminal 330. Therefore, the distributing system personnel can calculate the editing metadata 1800 without providing personnel engaged in the calculation of the editing metadata 1800. As a result, the video of the regular performance can be watched inexpensively and at camera angles corresponding to the demands of a subscriber.

According to the example, the camerawork of the cameras 311 to 314 can be controlled based on the scenario metadata 900 utilizing the advantages of the communication through the network 340. As a result, video data corresponding to the demands of each subscriber can be easily acquired without securing the personnel to switch the camera angles.

According to the example, by calculating the editing metadata 1800 based on the rule data that describes the progress rules of the contents of the program, the subscriber can watch the optimal video that follows the progress rules of the contents of the program without making all the settings. More specifically, for example, during a live performance of jazz music, when a setting for a spot light to illuminate only the solo player during the solo and the other members become difficult to see due to the darkness is described as a progress rule of the contents of the program, the video data of the solo player may be acquired regardless of the contents of the description in the electronic reservation data.

As a result, the occurrence of a state in which a video is completely dark and nothing can be seen can be prevented even when the subscriber does not know the progress rules of the contents of each program. At the calculation of the editing metadata 1800, when there is a possibility that the calculated editing metadata 1800 will be different from the contents of the description of the electronic reservation data, data indicating this fact may be output to the concerned network viewer terminal 330. In addition, data that prompts the subscriber to enter the electronic reservation again may be output to the corresponding network viewer terminal 330.

According to the example, by calculating the fee data concerning the usage charge corresponding to the output video data, the subscriber is charged properly corresponding to the amount and the contents of the video viewed. More specifically, for example, when the subscriber exits (stops the distribution) after a short time because the contents thereof is different from that expected, although the subscriber has entered (distribution of the video data has been initiated), the subscriber should be charged less than a subscriber who has received the video data in its entirety from start to finish. Thereby, proper charges corresponding to the usage state of the subscriber can be calculated utilizing the advantages of communication through the network 140.

When the evaluation data for the output video data is acquired and the scenario data 900 including the camera setting data 904 based on the acquired evaluation data is output, during the next session or at subsequent ones, the video data surely reflecting the evaluation of the subscriber can be output. That is, video data corresponding more precisely to the demands of the subscriber can be output utilizing the advantages of communication through the network 340.

In addition, metadata is employed as the description format of the program metadata 600, the scenario metadata 900, the editing metadata 1800, the pieces of distribution metadata 2000, 2100, and 2400, and the management metadata 2600 and, thereby, facilitating improved usability of the camera/distribution system in practical use. According to the example, as the cameras 311 to 314 included in the camera system 310 are plural, the video data for which the shooting angle has been switched by each of the cameras 311 to 314 can be selectively acquired, thereby enabling video data from more angles to be acquired. Therefore, video data corresponding more closely to the demands of each subscriber can be easily acquired.

FIG. 30 is a diagram for explaining an example of the scenario metadata. The scenario metadata 3000 in the FIG. 30 is described based on scores for, for example, classical music, instrumental ensemble, instrumental solos, vocal solos, chorus, wind music, etc. For example, in concerts that use scores of classical music, instrumental ensemble, instrumental solos, vocal solos, chorus, wind music, etc., the subject of attention (subject to be shot) may be extracted from the scores. By describing the extracted data in the scenario metadata 3000, the same effect as that of the example can be obtained.

More specifically, for example, the main melody is automatically identified by reading the scores as image data and analyzing the read image data. Data concerning the automatically identified main melody is described as the scenario metadata 3000. As the analysis technique of the image data acquired by reading the scores, various known image analysis techniques can be used and the description thereof is omitted herein.

Recently, electronic scoring and conversion into MIDI data of a full score have been advanced and, therefore, by scanning an electronic score, whether a part (for example, the strings) that plays the main melody or a solo player playing the solo melody or the tutti is present at an arbitrary point on the playing time axis can be determined.

For example, in the general score for classical music tutti, the parts are arranged in the vertical direction and bar numbers are written in the horizontal direction. The timing for switching the video data shot by each of the cameras 311 to 314 is according to the time. However, since the speed at which the music is actually played is not determined in the editing metadata 1800 before the playing, the time setting can not be made. Therefore, for example, the editing metadata 1800 may be described using the bar numbers.

FIG. 31 is a diagram for explaining an example of the editing metadata. The editing metadata 3100 shown in FIG. 31 is calculated based on the scenario metadata 3000 shown in FIG. 30. The metadata 3100 indicate the editing metadata 3100 obtained after the playing has been actually performed. The editing metadata 3100 is managed by the time described in the line of <TIME=" . . . ">, not the bar numbers. By detecting the coincidence of the melody that is extracted by the sound (music) recognition from the played music sound and the data describing the score on the electronic score, data of <TIME=" . . . "> for which the switching of the camera angles is described by the time information, i.e., the metadata, is calculated.

When a speech scenario or a choreography scenario is present in the case of, for example, an opera, a stage drama, or a dance show, automatic shooting may be set to be executed following the speech scenario or the choreography scenario. Recently, conversion of the speech scenarios and choreography scenarios into electronic signals in operas, stage dramas, and dance shows has progressed. Therefore, in this case, the part presenting the main dancing (for example, "the dance of ten forest spirits") or the solo part of a prima donna, or general dancing can be determined by reading the electronic scenario. This is described as the scenario data 3000.

FIG. 32 is a diagram for explaining an example of the editing metadata. In FIG. 32, the editing metadata for a comic theater is shown. The editing metadata 3200 may be calculated based on, for example, the detection result obtained by detecting the degree of excitement in the comedy theater based on the laughter and the clapping sounds of the audience in the theater. In this case, for example, by describing <MEMBER ANGLE="excitement"/>, etc., in the editing metadata 3200, the editing metadata 3200 may be used for selecting the scenes for distributing the video. By executing this scene selection, rather than all the programs, only a summarized portion, such as the exciting portion, can be edited and reproduced.

During stage transitions, the audience who are the ordinary people and exclude the performers may be unintentionally shot. With consideration of personal information protection, distribution of the video having the audience shot therein on the network without any processing must be prevented. Therefore, personal information can be protected by describing data, in the scenario metadata 3000, indicating whether the protection of personal information is to be executed.

FIG. 33 is a diagram for explaining an example of the scenario metadata. The scenario metadata 3300 shown in FIG. 33 has described therein the data indicating that personal information is to be protected. More specifically, for example, when <PERSONAL INFORMATION PROTECTION="true"/> is described, personal information is protected. For example, when a person other than persons registered as players is recognized by the face such as <FACE="face1.jpg", DB="faceDB"/> in the face DB 1200, image processing such as placing an occlusion over the face, replacement of the face of the person with animation, and replacement of the entire background that includes the person with an animated image. The image processing executed in this case is not particularly limited.

In addition, when a person to be shot unintentionally gets out of the shooting range of the camera or no subject to be shot is found in the predetermined cameras 311 to 314 due to a change in the arrangement on the stage, the camera angle may forcibly be switched to a camera angle that shoots the entire scene. As a result, in the case where engineers who manage the cameras 311 to 314 and the microphones 315 and 316 are not provided, even when an event beyond the scope described in the scenario metadata 900 has suddenly occurred, the video data satisfying the demands of the subscriber as much as possible can be distributed.

The method of distributing a video explained in the present embodiment can be implemented by a computer such as a personal computer and a workstation executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The invention claimed is:

1. A video distributing apparatus that distributes video data of a program to an external viewer, the video distributing apparatus comprising:

an editing-data calculating unit that calculates, based on scenario data describing contents of the program and reservation data describing a reservation for a video shoot using a camera, editing data indicating contents of the video data;

a video-data acquiring unit that selectively acquires, based on the editing data, video data shot by the camera installed at a fixed position; and an output unit that outputs, to the external viewer, the video data acquired by the video-data acquiring unit.

2. The video distributing apparatus according to claim 1, wherein the output unit outputs, to any one of the camera and a controlling apparatus that controls the camera, control data that is for controlling camerawork of the camera and based on the editing data, and the video data-acquiring unit acquires the video data shot by the camera controlled based on the control data.

3. The video distributing apparatus according to claim 1, wherein the editing-data calculating unit calculates the editing data based on rule data described by rules prescribing progression of the contents of the program.

4. The video distributing apparatus according to claim 1, further comprising:

a detecting unit that detects an output result for the video data output by the output unit; and a fee-data calculating unit that calculates, based on a result at the detecting unit, fee data that concerns a usage charge corresponding to the video data output.

5. The video distributing apparatus according to claim 1, further comprising:

an evaluation-data acquiring unit that acquires evaluation data concerning the video data output by the output unit, wherein the output unit outputs control data that is for controlling camerawork of the camera and based on the evaluation data.

6. The video distributing apparatus according to claim 1, wherein the editing data is metadata.

7. The video distributing apparatus according to claim 1, wherein the video-data acquiring unit selectively acquires the video data respectively shot by a plurality of cameras, each camera being respectively installed at a fixed position.

8. A video distributing method of distributing video data of a program to an external viewer, the video distributing method comprising:

calculating, based on scenario data describing contents of the program and reservation data describing a reservation for a video shoot using a camera, editing data indicating contents of the video data;

acquiring selectively, based on the editing data, video data shot by the camera installed at a fixed position; and outputting, to the external viewer, the video data acquired at the acquiring step.

9. A computer-readable recording medium storing therein a video distributing computer program for distributing video data of a program to an external viewer, that causes a computer to execute:

calculating, based on scenario data describing contents of the program and reservation data describing a reservation for a video shoot using a camera, editing data indicating contents of the video data;

acquiring selectively, based on the editing data, video data shot by a camera installed at a fixed position; and outputting, to the external viewer, the video data acquired at the acquiring step.

* * * * *